United States Patent
Sakurai et al.

(10) Patent No.: US 10,885,518 B2
(45) Date of Patent: Jan. 5, 2021

(54) ELECTRONIC MONEY SERVER, ELECTRONIC MONEY SERVER PROGRAM PRODUCT, RECORDING MEDIUM, AND LOSS PROCESSING METHOD

(71) Applicant: Rakuten, Inc., Tokyo (JP)

(72) Inventors: Takayuki Sakurai, Shinagawa-ku (JP); Hideki Akashika, Shinagawa-ku (JP)

(73) Assignee: Rakuten. Inc., Tokyo (JP)

( * ) Notice: Subject to any disclaimer, the term of this patent is extended or adjusted under 35 U.S.C. 154(b) by 888 days.

(21) Appl. No.: 14/369,478

(22) PCT Filed: Dec. 21, 2012

(86) PCT No.: PCT/JP2012/083309
§ 371 (c)(1),
(2) Date: Jun. 27, 2014

(87) PCT Pub. No.: WO2013/099812
PCT Pub. Date: Jul. 4, 2013

(65) Prior Publication Data
US 2015/0012439 A1 Jan. 8, 2015

(30) Foreign Application Priority Data

Dec. 28, 2011 (JP) .................................. 2011-290179

(51) Int. Cl.
*G06Q 20/00* (2012.01)
*G06Q 20/36* (2012.01)
(Continued)

(52) U.S. Cl.
CPC ..... *G06Q 20/3676* (2013.01); *G06Q 20/0655* (2013.01); *G06Q 20/349* (2013.01);
(Continued)

(58) Field of Classification Search
CPC .......... G06Q 20/3676; G06Q 20/0655; G06Q 20/349; G06Q 20/354; G06Q 20/3674; G06Q 20/40; G06Q 20/401
(Continued)

(56) References Cited

U.S. PATENT DOCUMENTS

| | | | |
|---|---|---|---|
| 6,679,423 B2 * | 1/2004 | Ijichi | G06Q 20/363 235/375 |
| 8,261,106 B2 * | 9/2012 | Hsieh | G06F 1/266 713/300 |

(Continued)

FOREIGN PATENT DOCUMENTS

| | | |
|---|---|---|
| JP | 9-182158 A | 7/1997 |
| JP | 11-85920 A | 3/1999 |

(Continued)

OTHER PUBLICATIONS

International Search Report for PCT/JP2012/083309 dated Jan. 22, 2013.

*Primary Examiner* — Patrick McAtee
*Assistant Examiner* — John M Winter
(74) *Attorney, Agent, or Firm* — Sughrue Mion, PLLC

(57) ABSTRACT

The objective of the present invention is, with respect to a portable terminal which is provided with an electronic money function, to facilitate restoration of an original state if a terminal has been discovered, while preventing unauthorized usage of electronic money at a time of loss for a terminal which is provided with an electronic money function. If a terminal is lost, an electronic money server is accessed from a second terminal in order to perform a loss lock request. The electronic money server turns ON a loss lock flag corresponding to an electronic money ID in order to output a negative flag ON instruction for an electronic money function section at a point at which access has been made from the terminal. For the electronic money function section, by turning ON a negative flag, the electronic money function section is locked so that settlements and charges are disabled.

15 Claims, 18 Drawing Sheets

(51) Int. Cl.
  *G06Q 20/06* (2012.01)
  *G06Q 20/40* (2012.01)
  *G06Q 20/34* (2012.01)

(52) U.S. Cl.
  CPC ....... *G06Q 20/354* (2013.01); *G06Q 20/3674* (2013.01); *G06Q 20/40* (2013.01); *G06Q 20/401* (2013.01)

(58) Field of Classification Search
  USPC .......................................................... 706/69
  See application file for complete search history.

(56) References Cited

U.S. PATENT DOCUMENTS

| | | | | |
|---|---|---|---|---|
| 2006/0281450 A1* | 12/2006 | Cocita | ..................... | H04M 1/66 |
| | | | | 455/418 |
| 2008/0093438 A1* | 4/2008 | Berntsen | ................ | G06Q 20/10 |
| | | | | 235/379 |
| 2009/0083555 A1* | 3/2009 | Challener | ........... | G06F 21/6209 |
| | | | | 713/310 |
| 2010/0273449 A1* | 10/2010 | Kaplan | ................... | G06F 21/31 |
| | | | | 455/411 |
| 2013/0166400 A1* | 6/2013 | Nguyen | ............... | G07G 1/0018 |
| | | | | 705/16 |

FOREIGN PATENT DOCUMENTS

| | | |
|---|---|---|
| JP | 2000-187701 A | 7/2000 |
| JP | 2001-222622 A | 8/2001 |
| JP | 2001-230858 A | 8/2001 |
| JP | 2002-352173 A | 12/2002 |
| JP | 2003-132291 A | 5/2003 |
| JP | 2006-279770 A | 10/2006 |
| JP | 2006-287503 A | 10/2006 |
| JP | 2006-352605 A | 12/2006 |
| JP | 2008-3889 A | 1/2008 |
| JP | 2009-31877 A | 2/2009 |
| JP | 2009-267511 A | 11/2009 |
| JP | 2011-134244 A | 7/2011 |

* cited by examiner

Fig.5

USER INFORMATION

| ELECTRONIC MONEY ID | USER NAME | USER ID | LOSS LOCK PASSWORD | LOSS LOCK FLAG | E-MAIL ADDRESS | ... |
|---|---|---|---|---|---|---|
| 12345678 | YAMADA TAROU | lmn123 | abcdefg | OFF | ... | ... |
| 87654321 | KATOU TETSUYA | PQ321 | hijklmn | ON | ... | ... |
| ... | ... | ... | ... | ... | ... | ... |

Fig.6

TRANSACTION INFORMATION

| ELECTRONIC MONEY ID | RECHARGING | | | PAYMENT | | |
|---|---|---|---|---|---|---|
| | TERMINAL ID | DATE AND TIME | RECHARGING AMOUNT | TERMINAL ID | DATE AND TIME | PAYMENT AMOUNT |
| 12345678 | ... | ... | ... | ... | ... | ... |
| 87654321 | ... | ... | ... | ... | ... | ... |
| ... | ... | ... | ... | ... | ... | ... |

Fig.7

LOSS DATA

| ELECTRONIC MONEY ID | FIXED BALANCE | FLAG | | | BALANCE PROCESS-ING METHOD | ... |
|---|---|---|---|---|---|---|
| | | RESTORA-TION STANDBY | EXTRACTION STANDBY | EXTRACTION COMPLETION | | |
| 12345678 | 12000 | ... | ... | ... | ... | ... |
| 87654321 | 6800 | ... | ... | ... | ... | ... |
| ... | ... | ... | ... | ... | ... | ... |

ELECTRONIC MONEY SERVER, ELECTRONIC MONEY SERVER PROGRAM PRODUCT, RECORDING MEDIUM, AND LOSS PROCESSING METHOD

CROSS REFERENCE TO RELATED APPLICATIONS

This application is a National Stage of International Application No. PCT/JP2012/083309, filed on Dec. 21, 2012, which claims priority from Japanese Patent Application No. 2011-290179, filed on Dec. 28, 2011, the contents of all of which are incorporated herein by reference in their entirety.

TECHNICAL FIELD

The present invention relates to electronic money servers, electronic money server program products, recording media, and loss processing methods, and relates to, for example, processing which is performed when a portable terminal having an electronic money function is lost.

BACKGROUND ART

Various portable terminals such as a mobile telephone and a smartphone which are provided with an electronic money function are widely used.

With this electronic money function, electronic money (called value or the like) having the same exchangeable value as money is written into (stored in) a noncontact IC chip, and accounts are adjusted by subtracting electronic money corresponding to an amount at the time of payment.

For example, a terminal (hereinafter an electronic money terminal) that performs addition and subtraction of electronic money by accessing the noncontact IC chip is installed in stores and so forth, and the user can purchase a product by paying electronic money in place of cash (performing subtraction processing).

Moreover, by making the electronic money function work in coordination with the function of a portable telephone, it is possible to perform purchase of a product and electronic money payment by subtraction processing by communication between a store (shop) on the Internet and a predetermined payment server.

If a portable terminal in which such electronic money is stored is lost, there is a possibility that the electronic money is used by a third party.

Thus, the technique of preventing unauthorized use of electronic money by another person when the portable terminal is lost and performing balance collection processing by which the stored electronic money is collected is proposed in Patent Document 1.

CITATION LIST

Patent Literature

Patent Document 1: JP-A-2003-132291

DISCLOSURE OF INVENTION

Problem to be Solved by the Invention

However, with the technique described in the patent document, if the balance collection processing is performed when the portable terminal is lost, although unauthorized use by a third party can be prevented, even if the portable terminal device is found later, since the electronic money has been collected, various procedures and operations are needed to restore the portable terminal device to the original state, which makes it difficult to perform restoration to original state.

A first object of the present invention is to prevent unauthorized use of electronic money when a portable terminal with an electronic money function is lost.

Moreover, a second object is to restore easily the original state of electronic money when the lost portable terminal is found.

SUMMARY OF THE INVENTION (1) The invention described in claim 1 provides an electronic money server comprising: a lock request accepting means for accepting, from a second terminal which is a terminal other than a portable terminal that performs recharging and payment by addition and subtraction of an electronic money balance in accordance with addition and subtraction instructions and is provided with an electronic money function section whose predetermined function is locked by a lock instruction, a lock request to lock the electronic money function section by identifying identification information by which the electronic money function section of the portable terminal is identified; a means for making a lock target storing means store the identification information of the electronic money function section whose lock has been accepted by the lock request; an access accepting means for accepting access from the portable terminal; an identification information obtaining means for obtaining from the portable terminal from which access has been accepted by the access accepting means, the identification information of the electronic money function section in the portable terminal; and a lock instruction outputting means for outputting, if the identification information obtained by the identification information obtaining means is stored in the lock target storing means, a lock instruction for the electronic money function section as a response to the portable terminal from which access has been accepted and achieves the first object.

(2) The invention described claim 2 according to claim 1, wherein the locked predetermined function of the electronic money function section of the portable terminal is restored by a restoration instruction, and the electronic money server includes a restoration request accepting means for accepting, from the second terminal which is a terminal other than the portable terminal, a restoration request to restore the electronic money function section from a locked state by identifying the identification information by which the electronic money function section of the portable terminal is identified, a restoration target storing means for storing the identification information of the electronic money function section whose restoration has been accepted by the restoration request, and a restoration instruction outputting means for outputting, if the identification information obtained by the identification information obtaining means is stored in the restoration target storing means, a restoration instruction for the electronic money function section as a response to the portable terminal from which access has been accepted and achieves the second object.

(3) The invention described claim 3 according to claim 1 or 2, wherein the portable terminal has a function of checking a balance of the electronic money function section, the electronic money server includes a balance requesting means for requesting notification of a balance of electronic money in the electronic money function section as a response to the portable terminal whose access has been accepted by the access accepting means, and a fixed balance storing means for obtaining the balance of electronic money notified by the portable terminal in response to the balance notification request and stores the balance as a fixed balance, and the lock instruction outputting means outputs a lock instruction after the fixed balance is stored.

(4) The invention described in claim 4 according to claim 1, 2, or 3, comprising: a balance extraction request accepting means for accepting, from the second terminal which is a terminal other than the portable terminal, an extraction request to extract an electronic money balance of the electronic money function section by identifying the identification information by which the electronic money function section of the portable terminal is identified; an extraction target storing means for storing the identification information of the electronic money function section whose extraction of electronic money balance has been accepted by the extraction request; and a subtraction instruction means for outputting, if the identification information obtained by the identification information obtaining means is stored in the extraction target storing means, a subtraction instruction to reduce the balance of the electronic money function section to zero as a response to the portable terminal from which access has been accepted.

(5) The invention described claim 5 according to any one of claims 1 to 4, comprising: a portable terminal request accepting means for accepting, from the portable terminal from which access has been accepted by the access accepting means, a lock request to lock the electronic money function section or an unlock request to release lock by identifying the identification information of the electronic money function section; a portable terminal instruction outputting means for outputting a user lock instruction or an unlock instruction for the electronic money function section in response to the lock request or the unlock request that has been accepted by the portable terminal request accepting means as a response to the portable terminal from which access has been accepted; and an unlock prohibiting means for prohibiting, if the lock request is accepted from the second terminal which is a terminal other than the portable terminal, unlock of the electronic money function section corresponding to the identification information identified by the lock request accepting means.

(6) The invention described claim 6 an electronic money server program product that makes a computer function as: a lock request accepting means for accepting, from a second terminal which is a terminal other than a portable terminal that performs recharging and payment by addition and subtraction of an electronic money balance in accordance with addition and subtraction instructions and is provided with an electronic money function section whose predetermined function is locked by a lock instruction, a lock request to lock the electronic money function section by identifying identification information by which the electronic money function section of the portable terminal is identified; a means for making a lock target storing means store the identification information of the electronic money function section whose lock has been accepted by the lock request; an access accepting means for accepting access from the portable terminal; an identification information obtaining means for obtaining, from the portable terminal from which access has been accepted by the access accepting means, the identification information of the electronic money function section in the portable terminal; and a lock instruction outputting means for outputting, if the identification information obtained by the identification information obtaining means is stored in the lock target storing means, a lock instruction for the electronic money function section as a response to the portable terminal from which access has been accepted.

(7) The invention described claim 7 a computer-readable recording medium on which an electronic money server program product is recorded, the electronic money server program product for making a computer function as: a lock request accepting means for accepting, from a second terminal which is a terminal other than a portable terminal that performs recharging and payment by addition and subtraction of an electronic money balance in accordance with addition and subtraction instructions and is provided with an electronic money function section whose predetermined function is locked by a lock instruction, a lock request to lock the electronic money function section by identifying identification information by which the electronic money function section of the portable terminal is identified; a means for making a lock target storing means store the identification information of the electronic money function section whose lock has been accepted by the lock request; an access accepting means for accepting access from the portable terminal; an identification information obtaining means for obtaining, from the portable terminal from which access has been accepted by the access accepting means, the identification information of the electronic money function section in the portable terminal; and a lock instruction outputting means for outputting, if the identification information obtained by the identification information obtaining means is stored in the lock target storing means, a lock instruction for the electronic money function section as a response to the portable terminal from which access has been accepted.

(8) The invention described claim 8 a loss processing method comprising: a lock request accepting step in which a lock request accepting means accepts, from a second terminal which is a terminal other than a portable terminal that performs recharging and payment by addition and subtraction of an electronic money balance in accordance with addition and subtraction instructions and is provided with an electronic money function section whose predetermined function is locked by a lock instruction, a lock request to lock the electronic money function section by identifying identification information by which the electronic money function section of the portable terminal is identified; a lock target storing step in which a lock target storing control means makes a lock target storing means store the identification information of the electronic money function section whose lock has been accepted by the lock request; an access accepting step in which an access accepting means accepts access from the portable terminal; an identification information obtaining step in which an identification information obtaining means obtains, from the portable terminal from which access has been accepted by the access accepting means, the identification information of the electronic money function section in the portable terminal; and a lock instruction outputting step in which a lock instruction outputting means outputs, if the identification information obtained by the identification information obtaining means is stored in the lock target storing means, a lock instruction for the electronic money function section as a response to the portable terminal from which access has been accepted.

Effect of the Invention

According to the present invention, since, by identifying identification information by which an electronic money function section of a portable terminal is identified, a lock request to lock the electronic money function section is accepted from a second terminal which is a terminal other than the portable terminal and a lock instruction to lock the electronic money function section is output as a response to the portable terminal that has accepted access, it is possible to prevent easily unauthorized use of electronic money of a lost portable terminal.

Moreover, since, by identifying identification information by which an electronic money function section of a portable terminal is identified, a restoration request to restore the electronic money function section from a locked state is accepted from a second terminal which is a terminal other than the portable terminal and a restoration instruction for the electronic money function section is output as a response to the portable terminal that has accepted access, it is possible to restore easily the locked electronic money function section to the original state.

BRIEF DESCRIPTION OF DRAWINGS

FIG. 5 is a diagram depicting an example of the logical configuration of user information stored in a user information database;

FIG. 6 is a diagram depicting an example of the logical configuration of transaction information stored in a transaction information database;

FIG. 7 is a diagram depicting an example of the logical configuration of loss data stored in a loss database;

BEST MODES FOR CARRYING OUT THE INVENTION

Figure 1:
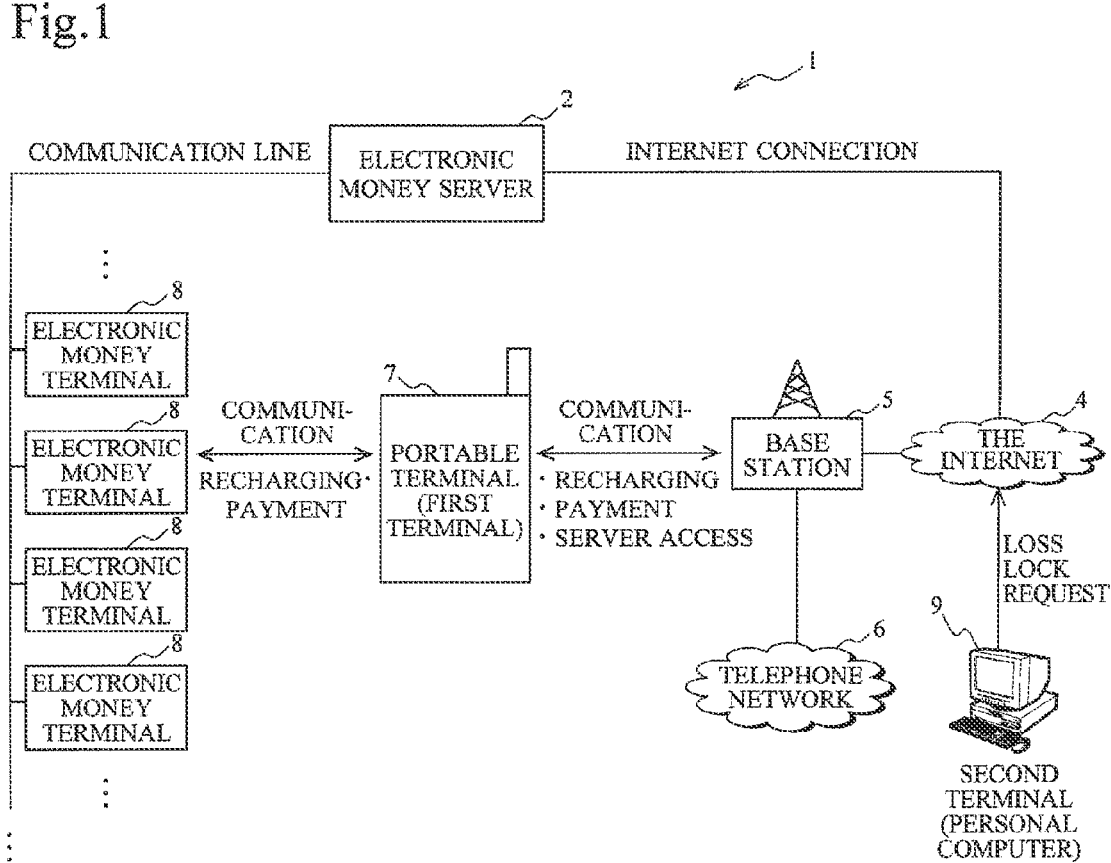
FIG. 1 is a diagram depicting an example of the configuration of an electronic money operation system of an embodiment.

Hereinafter, a preferred embodiment of the present invention will be described in detail with reference to the drawings.

(1) Outline of an Embodiment

An electronic money system of this embodiment is a system in which, when the user loses a portable terminal with an electronic money function section (an IC chip), an electronic money server locks electronic money and releases the lock in response to a request from another terminal (a second terminal such as a personal computer and other portable terminals).

In addition, when the user loses the portable terminal, the user accesses the electronic money server from the second terminal, and, after identifying an electronic money ID (identification information for identifying the electronic money function section) attached to the electronic money function section, the user requests to lock for the loss "loss lock". In the electronic money server, the electronic money server stores the identified electronic money ID as a subject of loss lock in an identifiable manner and waits until there is access from the portable terminal.

When there is access to the electronic money server from the portable terminal, if the electronic money ID that is sent from the portable terminal when the access is made is a subject of loss lock, the electronic money server sends an instruction to lock the electronic money function section to the portable terminal. In the portable terminal, by transferring the lock instruction to the electronic money function section, the electronic money function section is locked. This lock is implemented by turning on a negative flag of a storing section in the electronic money function section.

The above implementation uses the function of an electronic money terminal that makes a payment by subtracting electronic money, the function of checking the state of the electronic money function section of the portable terminal at the time of payment and suspending processing if the electronic money terminal confirms that the negative flag is in an ON state.

If the lost portable terminal is found after loss lock is set, the user accesses the electronic money server from another terminal and makes a restoration request, and, in the electronic money server, the electronic money server stores the identified electronic money ID as an object of restoration in an identifiable manner.

Then, when there is access to the electronic money server from the portable terminal, the electronic money server sends, to the portable terminal, an instruction to restore the locked state of the electronic money function section to an original state. In the portable terminal, by transferring the restoration instruction to the electronic money function section, the lock on the electronic money function section is released. This release from the locked state is implemented by changing the negative flag of the storing section in the electronic money function section from ON to OFF.

As described above, in this embodiment, the electronic money server controls to lock on the electronic money function section of the portable terminal and to release from the lock in response to access from the lost portable terminal.

In addition, access from the lost portable terminal is made when the user or a third party starts an electronic money application of the portable terminal, but it is preferable that access is made more often in order to prevent unauthorized use by the third party more reliably.

Thus, an electronic money application of the portable terminal of this embodiment has the function of accessing the electronic money server every predetermined time T (for example, every one hour). Execution of this function of accessing the electronic money server every predetermined time T is started when the user subscribes to a loss lock service. In addition to this, the execution of this function may be started when user registration is completed or when setting is made so that an electronic money service is made available (that is, so that the electronic money application is made available).

As described above, with the electronic money system, only by making a loss lock request and a restoration request from the second terminal which is a terminal other than the lost portable terminal after identifying the electronic money ID, since the electronic money server locks the electric money function and releases the lock when there is access from the portable terminal, it is possible to restore the original state easily when the portable terminal is found while preventing unauthorized use of electronic money when the portable terminal is lost.

Incidentally, the portable terminal has an electronic money function and a communication function, and various portable information processing devices fall under the category of the portable terminal; for example, a portable telephone, a PHS, a smartphone, a tablet terminal, and so forth fall under the category of the portable terminal. As for the communication function, any mode can be used as long as communication with the electronic money server is possible.

(2) Details of the Embodiment

FIG. 1 is a diagram depicting an example of the configuration of an electronic money operation system 1 using the electronic money server (money information processing apparatus) of this embodiment.

The electronic money operation system 1 is formed of a portable terminal 7 functioning as a first terminal, an electronic money server 2, the Internet 4, a base station 5, a telephone network 6, electronic money terminals 8, 8, a personal computer (hereinafter referred to as a PC) functioning as a second terminal 9, and so forth.

The portable terminal 7 has an Internet connection function and, in addition to this, incorporates a noncontact IC chip (forming an electronic money function section) for an electronic money card, and can perform writing (recharging) and subtraction (payment) of electronic money by performing communication with the electronic money terminal 8.

Incidentally, the electronic money is a concept corresponding to money in the operation of the electronic money system, is money information expressing the amount of money value as electronic data, and is called value or the like depending on the system in which the electronic money is adopted.

The electronic money is brought into correspondence with actual money by collecting, when electronic money is issued, money whose amount corresponds to the electronic money from the user and distributing the money among stores (hereinafter member stores) that have made a payment by electronic money in accordance with a payment amount.

The base station 5 can perform radio communication with the portable terminal 7 and connects the portable terminal 7 to the telephone network 6 or the Internet 4.

The telephone network 6 is a so-called public network and can connect terminal devices, such as a telephone set and a facsimile, to each other. By connecting the portable terminal 7 to the telephone network 6, the base station 5 can offer a telephone service to the user.

The Internet 4 is a network that connects a server device, a terminal device, and so forth. To the Internet 4, a server device that offers various services is connected, and, by connecting the portable terminal 7 to the Internet 4, the base station 5 can allow the user to use the services offered on the Internet 4.

The electronic money server 2 is a server device installed by an electronic money business operator, and collects information on the issue status and the status of use of electronic money and performs various kinds of information processing for operating electronic money tasks by using the information.

Moreover, the electronic money server 2 connects to the Internet 4 and offers various services related to the electronic money on the Internet 4.

The electronic money server 2 of this embodiment performs, in response to a request from the PC 9, various kinds of loss processing such as lock and restoration of the electronic money function section and extraction of a balance when the portable terminal 7 is lost.

The electronic money terminal 8 is a terminal device for accessing a noncontact IC card, the terminal device installed in a store or the like, and is a dedicated device configured for electronic money tasks.

The electronic money terminal 8 includes a reader/writer section incorporating an antenna and, by performing short-distance radio communication with an electronic money function section 12 (which will be described later) of the portable terminal 7 by transmitting and receiving radio waves with this antenna, writes electronic money or makes a payment by subtracting the electronic money.

The electronic money terminal 8 is connected to the electronic money server 2 via a communication line and sends, to the electronic money server 2, information on the electronic money processing which the electronic money terminal 8 has performed on the portable terminal 7. In addition to performing this sending processing in real time, an offline configuration can also be adopted in which this sending processing is performed in such a way that information is accumulated to some extent and is then collectively sent to the electronic money server 2.

By adopting the offline configuration, there is no need for the electronic money terminal 8 to access the electronic money server 2 when processing the electronic money by performing communication with the electronic money function section 12 of the portable terminal 7, which makes it possible to perform electronic money processing at high speed.

The overall configuration of the electronic money operation system 1 has been described, but this is an example of the conceptual configuration and there are various modified examples.

For example, as the electronic money terminal 8, in addition to the terminal installed in a member store, there is also, for example, a terminal device dedicated to payment which is incorporated into a vending machine or a terminal device dedicated to recharging which is installed in a public square or the like.

Moreover, a detachable storage medium that accumulates information on electronic money processing may be installed in the electronic money terminal 8, and a person in charge goes off to the installation place to collect the storage medium. From the storage medium thus collected, the information on the electronic money processing is read and input to the electronic money server 2.

Furthermore, there is a case where information on electronic money processing is sent to a receiving apparatus from the electronic money terminal 8 via radio waves, and the information is sent from the receiving apparatus to the electronic money server 2 via a communication line. In this case, one receiving apparatus can perform communication with a plurality of electronic money terminals 8.

Figure 2:
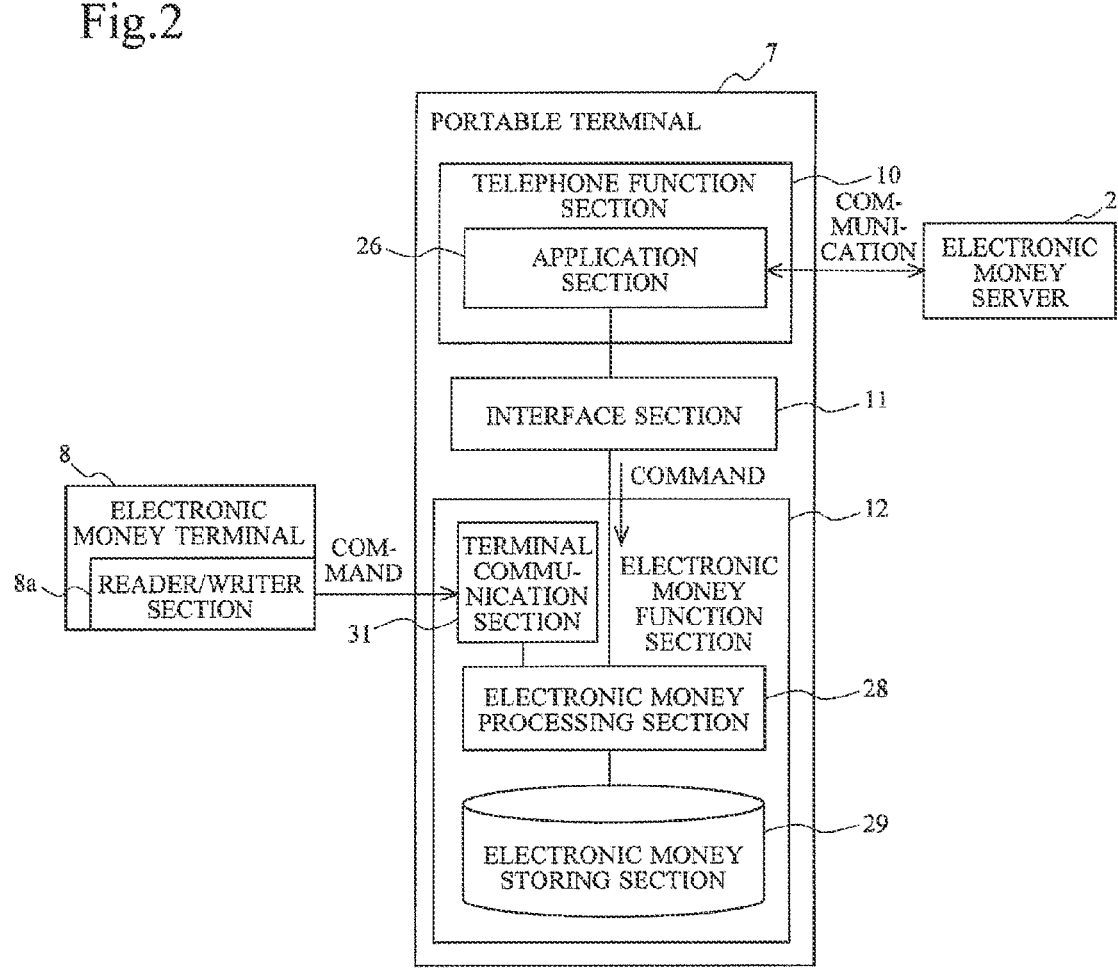
FIG. 2 is a functional diagram depicting an example of the functional configuration of a portable telephone.

FIG. 2 is a functional diagram depicting an example of the functional configuration of the portable terminal 7.

Incidentally, the portable terminal 7 allows the user to select a telephone mode in which a telephone call is made or an application mode offered by application software installed in the portable terminal 7, and FIG. 2 depicts the function that is performed when the portable terminal 7 is operated in the application mode.

The portable terminal 7 is formed of a telephone function section 10 that offers a telephone call function and an Internet connection function, the electronic money function section 12 provided with an electronic money processing function, and an interface section 11 that connects the telephone function section 10 and the electronic money function section 12.

The telephone function section 10 includes an application section 26, which can be used in the application mode.

The application section 26 offers various services online or offline. When the application section 26 operates online, the application section 26 can function as a browser by connecting to the Internet 4.

In this case, based on the entry of a URL (Uniform Resource Locator) performed by the user, the application section 26 connects the portable terminal 7 to an intended service site identified by this URL and performs communication.

Then, when the service site sends screen data, the application section 26 receives the screen data and displays a screen defined by this screen data on a display.

Moreover, the application section 26 also sends, to the electronic money server 2, the information entered by the user to the screen displayed on the display.

The application section 26 can perform communication with the electronic money function section 12 via the interface section 11, and the application section 26 selects and extracts information to be sent to the electronic money function section 12 from among the information received from the electronic money server 2 and sends out the information to the electronic money function section 12. Moreover, the application section 26 selects and extracts information to be sent to the electronic money server 2 from among the information received from the electronic money function section 12 and sends the information to the electronic money server 2.

The application section 26 also offers the function of checking the balance of electronic money and the record (log data) of deposit and withdrawal of electronic money from the electronic money function section 12 and displaying the balance of electronic money and the record (log data) of deposit and withdrawal of electronic money on the display by an entry operation performed by the user independently of an instruction from the electronic money server 2.

The interface section 11 is an interface that mediates transmission and reception of information between the telephone function section 10 and the electronic money function section 12. As will be described later, the electronic money function section 12 is formed of a noncontact IC chip, and the interface section 11 offers an interface suitable for the specifications of the noncontact IC chip.

Moreover, the interface section 11 also has the function of decoding the data (which is encrypted) sent from the electronic money server 2 and inputting the decoded data to the electronic money function section 12 and encrypting the data output from the electronic money function section 12 and inputting the encrypted data to the telephone function section 10. As described above, by encrypting the data that is transmitted and received between the electronic money server 2 and the portable terminal 7, it is possible to increase security.

The electronic money function section 12 includes an electronic money processing section 28 (a processing unit), an electronic money storing section 29 (a money information storing unit), and a terminal communication section 31 (an operation information receiving unit, a connecting unit).

The electronic money processing section 28 is a function section that accepts the input of various commands (operation information) related to electronic money processing and performs various kinds of electronic money processing such as addition and subtraction of electronic money and loss processing by ON and OFF of a negative flag in this embodiment in accordance with these commands.

The commands include, for example, an addition command for adding electronic money, a subtraction command for subtracting electronic money, a balance reference command for reading the current balance of electronic money, a negative flag ON instruction, a negative flag OFF instruction, and so forth.

The addition command is a command used when electronic money is added (accumulated), and an addition command corresponding to an amount to be added to the electronic money storing section 29 is set. The electronic money processing section 28 adds the amount (the amount to be added) set by the addition command to the amount (the balance) of electronic money that is already stored.

The subtraction command is a command used when a payment by electronic money is made, and a subtraction command corresponding to an amount to be subtracted from the electronic money storing section 29 is set. The electronic money processing section 28 subtracts the amount (the amount to be subtracted) set by the subtraction command from the amount (the balance) of electronic money that is already stored.

To the addition command and the subtraction command, in addition to an amount to be added or subtracted, various kinds of information can be set and attached. For example, these information may include an electronic money terminal ID by which the electronic money terminal 8 is identified, a member store ID by which a member store is identified, a processing date and time, and so forth, and these information is stored in the electronic money storing section 29 along with the amount (the remaining amount after addition or subtraction, the balance) of electronic money as a history.

The electronic money storing section 29 is a function section that stores log data related to electronic money. This log data is the record of the history of electronic money processing such as writing of electronic money, subtraction, balance reference, and so forth, and, by referring to the log data, it is possible to grasp the current balance of electronic money, the history of the past electronic money processing, and so forth.

The contents to be recorded as the log data are the date and time of processing, the type of processing, the value of a change if the amount of electronic money is changed by processing (for example, the amount of written electronic money if electronic money is written and the amount of subtracted electronic money if electronic money is subtracted), information such as the terminal ID of the electronic money terminal 8, the current electronic money balance, the member store ID by which the member store in which the electronic money terminal 8 is installed is identified, and so forth if the electronic money is processed as a result of the electronic money terminal 8 being accessed.

The terminal communication section 31 is a function section that performs radio communication with the electronic money terminal 8. The electronic money terminal 8 includes a reader/writer section 8a incorporating an antenna for performing radio communication with a noncontact IC chip, and radio communication is performed between the reader/writer section 8a and the terminal communication section 31.

In the portable terminal 7 configured as described above, a command can be input to the electronic money processing section 28 from the telephone function section 10 or the electronic money terminal 8.

When a command is input from the telephone function section 10, it is possible to refer to a balance offline (the application section 26 displays the balance on the display) and perform recharging of electronic money and payment by inputting a write command or a subtraction command from the electronic money server 2 online.

Figure 3:
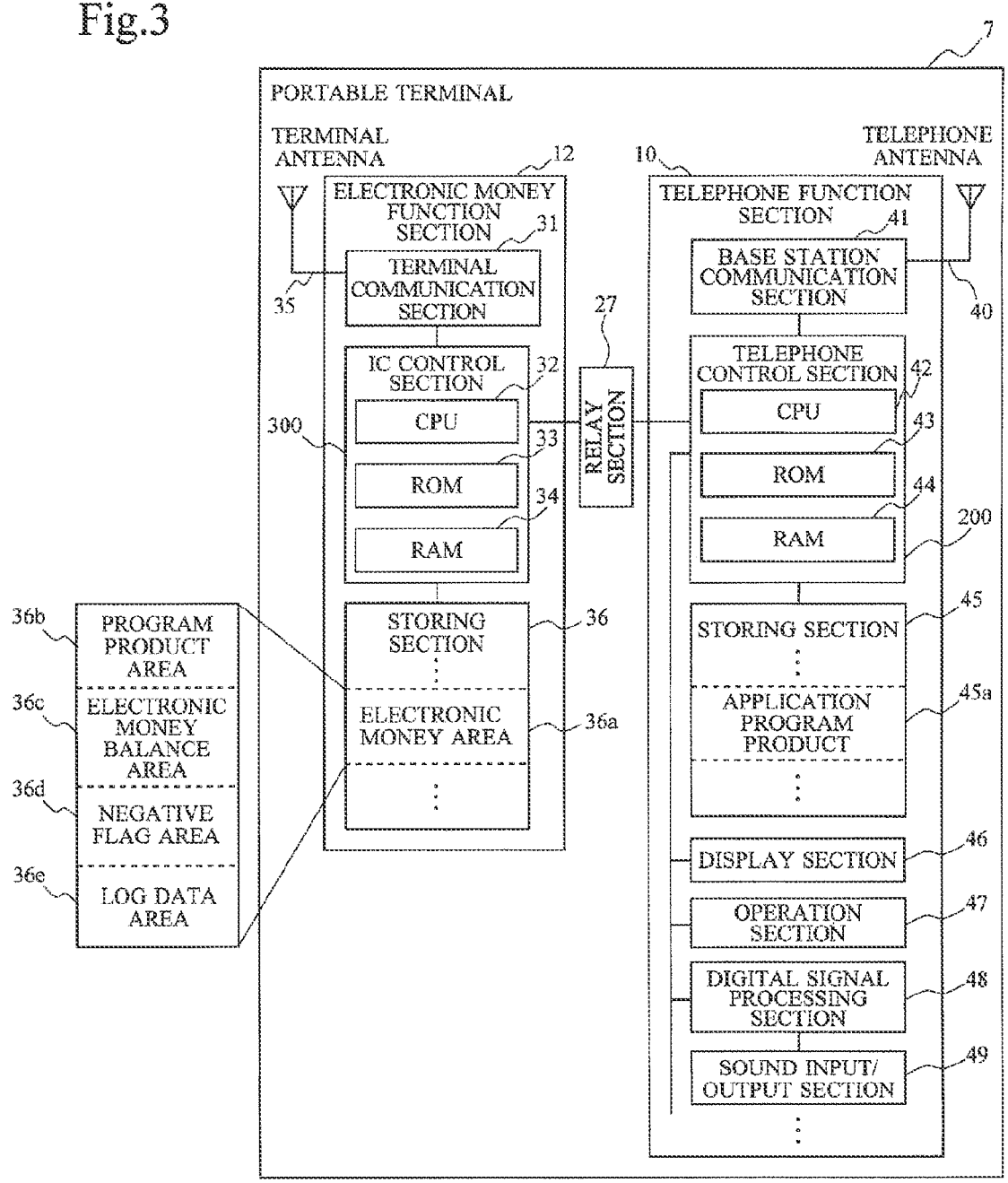
FIG. 3 is a diagram depicting an example of the hardware configuration of the portable telephone.

FIG. 3 is a diagram depicting an example of the hardware configuration of the portable terminal 7.

The telephone function section 10 is formed of a telephone antenna 40, a base station communication section 41, a telephone control section 200, a storing section 45, a display section 46, an operation section 47, a digital signal processing section 48, a sound input/output section 49, and so forth.

The telephone antenna 40 emits radio waves toward the base station 5 and absorbs the radio waves emitted from the antenna of the base station 5. This makes it possible for the portable terminal 7 to perform radio communication with the base station 5 and perform telephone conversation and connection to the Internet 4 via the base station 5.

The base station communication 41 is a function section for driving the telephone antenna 40 and, for example, amplifies a signal to be sent from the telephone antenna 40 and amplifies the signal received from the base station 5 and offers the amplified signal to the telephone control section 200.

The telephone control section 200 is formed of a CPU 42, ROM (Read Only Memory) 43, RAM (Random Access Memory) 44, and so forth.

The CPU 42 is a central processing unit that executes a predetermined program product and performs various kinds of information processing and can cause the telephone function section 10 to fulfill a function as the portable terminal 7 provided with the Internet connection function.

The CPU 42 functions as a telephone set or a terminal of the Internet 4 by executing the program product stored in the ROM 43, the RAM 44, or the storing section 45.

The ROM 43 is read-only memory provided so as to be readable by the CPU 42, and a program product to be executed by the CPU 42, a parameter, and so forth are stored therein.

In the ROM 43, for example, an OS which is a basic program product used by the CPU 42 to operate is stored.

The RAM 44 is readable/writable memory that provides a working area to the CPU 42 when the CPU 42 is operating.

In the storing section 45, a program product, data, and so forth that are used by the CPU 42 are stored. The storing section 45 is memory from and to which the CPU 42 can perform reading and writing, and, for example, flash memory, an EEPROM (Electrically Erasable and Programmable ROM), and so forth are used.

In the storing section 45, an application program product 45a for implementing various application functions in the CPU 42 is stored.

As an example of the application program product 45a, the electronic money application according to this embodiment is provided, and, with this electronic money application, the function of issuing a balance check instruction to the electronic money function section 12, sending the electronic money ID by automatically accessing the electronic money server 2 every predetermined time t (for example, one hour) for loss processing, and performing completion processing (for example, screen display) corresponding to various processing completion notifications that are sent from the electronic money server 2 is implemented.

When the application program product 45a is executed in the CPU 42, the application section 26 (FIG. 2) is configured in the form of software.

Incidentally, though not depicted in the drawing, in the storing section 45, in addition to those described above, a telephone number and an e-mail address registered by the user, a kana-kanji conversion program product, and other information are stored.

The display section 46 is a function section that displays character information and images on the display.

In the telephone mode, the display section 46 displays a list of the telephone numbers registered by the user in a selectable manner and displays information used for a telephone call, such as the degree of intensity of the radio waves transmitted from the base station 5 and the telephone number entered by the user or the telephone number of a telephone set of the other person who made a telephone call.

In the application mode, the display section 46 displays, for example, a browser screen offered by the application program product 45a, displays a URL entry field, a screen that is sent from a server device, e-mail, and so forth, and displays a screen based on various kinds of information, such as completion notification, which is sent from the electronic money server 2 in the loss processing in this embodiment.

The operation section 47 includes a keyboard and converts a key operation performed by the user into an electrical signal and inputs the electrical signal to the CPU 42.

The sound input/output section 49 includes a microphone and a speaker, and, for example, converts the sound received by the microphone into an analog signal and converts an analog signal into sound and outputs the sound from the speaker.

The user can convert his/her voice into an electrical signal and input the electrical signal to the telephone function section 10 from the microphone and can convert the sound signal output from the telephone function section 10 into sound and hear the sound from the speaker.

The digital signal processing section 48 is a function section that converts sound data into a digital signal from an analog signal or from a digital signal into an analog signal at high speed and is formed by using, for example, a DSP (Digital Signal Processor). Moreover, the digital signal processing section 48 also performs compression and expansion of sound data.

While the microphone and the speaker use an analog signal, the other function sections of the telephone function section 10 use a digital signal. Thus, the digital signal processing section 48 converts the analog signal output from the microphone into a digital signal and then compresses the digital signal when inputting a sound signal, and converts the digital signal output from the telephone function section 10 into an analog signal by expanding the digital signal and outputs the analog signal to the speaker when outputting a sound signal.

The electronic money function section 12 is formed of a terminal antenna 35, a terminal communication section 31, an IC control section 300, a storing section 36, and so forth. Of these sections, all the components except the terminal antenna 35 are housed in one IC chip.

Moreover, the IC control section 300 and the telephone control section 200 are connected to each other by a relay section 27.

In this embodiment, the electronic money function section 12 is assumed to be incorporated into the portable terminal 7, but the configuration is not limited thereto, and the electronic money function section 12 can also be configured to be detachable.

The terminal antenna 35 performs communication with the antenna provided in the reader/writer section 8a of the electronic money terminal 8 via radio waves.

In addition to driving the terminal antenna 35, the terminal communication section 31 amplifies a signal to be sent and received, for example.

The IC control section 300 is formed of a CPU 32, ROM 33, RAM 34, and so forth.

The CPU 32 is a central processing unit that performs electronic money processing by executing a program product stored in the ROM 33, the RAM 34, the storing section 36, and so forth.

The ROM 33 is read-only memory provided so as to be readable by the CPU 32. In the ROM 33, for example, an OS which is a basic program product for making the CPU 32 operate is stored.

Moreover, a unique IC chip ID is assigned to each IC chip in a fabrication stage of an IC chip, and this IC chip ID is also stored in the ROM 33.

The IC chip ID is not changed after being shipped from a factory and is generally set such that the user cannot read the IC chip ID.

The RAM 34 is readable/writable memory that provides a working area to the CPU 32 when the CPU 32 is operating.

The storing section 36 is a storage medium that is formed of, for example, flash memory, an EEPROM, or the like and is provided so as to be readable and writable by the CPU 32. In the storing section 36, an application program product and other data can be stored.

In the storing section 36 of this embodiment, an electronic money area 36a for managing electronic money is provided.

In the electronic money area 36a, a program product area 36b in which a program product is stored, an electronic money balance area 36c, a negative flag area 36d, and a log data area 36e in which log data is stored are further formed.

In the program product area 36b, an electronic money processing program product for making the CPU 32 implement the electronic money processing function is installed. When the electronic money processing program product is executed in the CPU 32, the electronic money processing section 28 and the electronic money storing section 29 (FIG. 2) are configured in the form of software.

Moreover, in using the electronic money service, a unique electronic money ID is attached to each IC chip in which the electronic money processing program product is installed, and this electronic money ID is stored in the program product area 36b.

In addition to those described above, in the program product area 36b, key information used by the electronic money terminal 8 to authenticate the electronic money function section 12 and other information are also stored.

In the electronic money balance area 36c, electronic money is stored, and, as described earlier, the amount of electronic money is changed by the addition and subtraction commands sent from the electronic money terminal 8 and the electronic money server 2.

In the negative flag area 36d, an ON or OFF negative flag is stored, and the state of the negative flag is rewritten based on an instruction from the electronic money server 2. Rewriting of ON and OFF of the negative flag area 36d is configured so as not to be performed unless an instruction from the electronic money server 2 is issued because this rewriting performs switching between a state in which the electronic money function section 12 is enabled and a state in which the electronic money function section 12 is disabled.

The electronic money terminal 8 is notified of the state of the negative flag in accordance with state check demanded by the electronic money terminal 8 at the time of payment.

Figure 4:
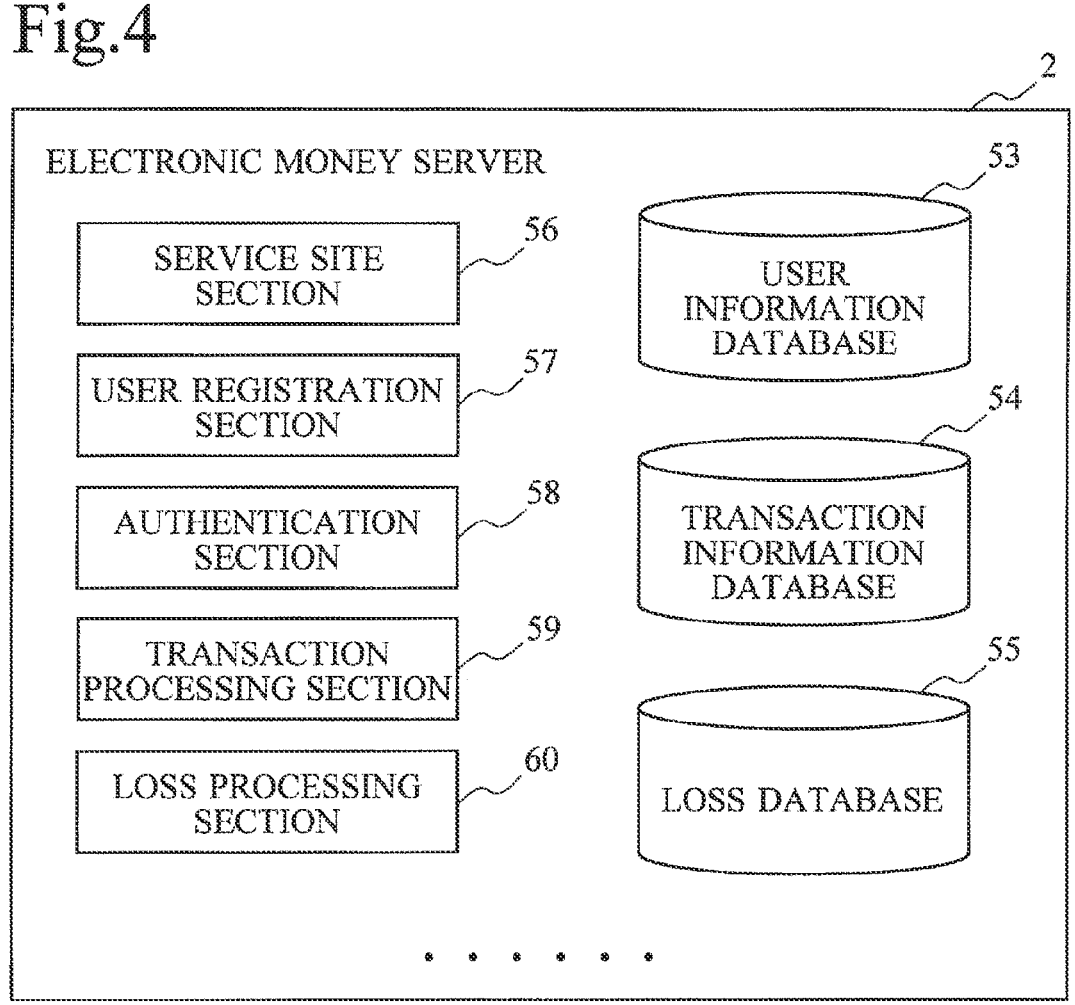
FIG. 4 is a conceptual diagram depicting an example of the functional configuration of an electronic money server.

FIG. 4 is a conceptual diagram depicting an example of the functional configuration of the electronic money server 2.

The electronic money server 2 is formed of a service site section 56, a user registration section 57, an authentication section 58, a transaction processing section 59, a loss processing section 60, other various function sections, a user information database 53, a transaction information database 54, a loss database 55, and other various databases.

In this embodiment, it is assumed that the electronic money server 2 offers services by electronic money, but the configuration is not limited thereto, and services by electronic money may be offered by a system formed by combining a plurality of server devices.

For example, services by electronic money can be offered by combining server devices such as a Web server that opened a service site for electronic money, an authentication server that performs user authentication, and a transaction processing server that performs transaction processing.

The service site section 56 is a function section that operates, on the Internet 4, a Web site related to the electronic money service.

The user can access a service site by entering the URL of the service site from the portable terminal 7 or other terminals and can use various services offered by the service site.

When accessed by the portable terminal 7, the service site section 56 sends screen data for displaying a main menu screen.

On the main menu screen, items of services offered by the service site are displayed in a selectable manner, and the user can select an intended item.

As the items of services, for example, in addition to items related to the use of electronic money such as user registration, change of user registration information, recharging of electronic money, and payment processing by electronic money, various items such as provision of an announcement such as a campaign and acceptance of an inquiry from a customer are prepared. When the user selects an item from among these items, in the electronic money server 2, a corresponding function section is started.

The user registration section 57 is a function section that performs processing related to user information, such as new user registration, deregistration, and change of registration information.

These user information is stored in the user information database 53, and the user registration section 57 performs these processing by updating the user information database 53.

The authentication section 58 is a function section that authenticates the user when the registered user uses the service site.

The services offered by the service site section 56 include a service that does not require authentication and a service that requires authentication. The user can use the service that requires authentication by being authenticated.

Authentication is performed by various methods using a loss lock password set by the user in advance, a user ID, an IC chip ID, an electronic money ID, a telephone number of the portable terminal, a telephone number of another telephone set, a name, and so forth. For example, a case where the identity is confirmed if only the loss lock password matches the entered data, a case where the identity is confirmed if items greater than or equal to at least N items of the items described above match the entered data, and a case where the identity is confirmed if any one ID and another one item match the entered data are possible.

In this embodiment, the identity is confirmed if both the user ID and the loss lock password which are sent from the second terminal 9 match the registered data.

Of the above items used for authentication, the IC chip ID and the electronic money ID are read by the telephone function section 10 from the electronic money function section 12 and are sent to the electronic money server 2, and, as for the other items such as the loss lock password and the name, those entered by the user from the portable terminal 7 are sent to the electronic money server 2.

Incidentally, as for various data for authentication, except the IC chip ID, the data may be registered as a result of being sent from a terminal device such as a personal computer and other portable terminals to the electronic money server 2.

The transaction processing section 59 is a function section that records, on the transaction information database 54, information (such as recharging, payment, and balance reference) related to processing of electronic money which the electronic money terminal 8 has performed on the portable terminal 7. The information recorded by the transaction processing section 59 is sent from the electronic money terminal 8.

Moreover, for example, the transaction processing section 59 also analyzes the data in the transaction information database 54 and outputs the analysis results.

The loss processing section 60 is a function section that offers a loss processing service that is provided when the portable terminal 7 is lost.

That is, the loss processing section 60 prevents unauthorized use of electronic money by a third party by locking the electronic money function section 12 by changing the negative flag area 36d of the electronic money function section 12 in the lost portable terminal 7 to a negative flag ON state in response to a loss lock request from the second terminal 9 (a personal computer or other portable terminals).

Moreover, when the portable terminal 7 on which loss lock has been set is found, the loss processing section 60 restores the electronic money function section 12 to the original state by returning the negative flag area 36d to a negative flag OFF state in response to a restoration request from the second terminal 9.

Furthermore, when, for example, the portable terminal 7 on which loss lock has been set cannot be found, the loss processing section 60 extracts electronic money balance by performing subtraction processing in such a way that the amount of electronic money recorded in the electronic money balance area 36c of the lost electronic money function section 12 is reduced to zero in response to a balance extraction request from the second terminal 9 and returns the extracted balance (the electronic money that matches the subtracted amount) to the user.

Incidentally, in the subtraction processing, as a result of the electronic money server 2 sending, to the portable terminal 7, an instruction to subtract the same amount as the amount of electronic money stored in the electronic money balance area 36c and the subtraction instruction being executed in the electronic money function section 12 in the portable terminal 7, the balance of electronic money stored in the electronic money balance area 36c becomes zero. Then, extraction is performed by recording the extracted balance and the electronic money ID and the completion of extraction in the loss database 55 in a state in which the extracted balance and the electronic money ID are related to the completion of extraction.

FIG. 5 is a diagram depicting the logical configuration of user information stored in the user information database 53.

The user information is formed of items such as an electronic money ID, a user name, a user ID, a loss lock password, a loss lock flag, an e-mail address, though not depicted in the drawing, an IC chip ID, and so forth.

The electronic money ID is assigned to each noncontact IC chip of the portable terminal 7 and, with this ID, it is possible to identify the noncontact IC chip. The electronic money server 2 arranges the information concerning electronic money processing by relating the user information such as the user name and the loss lock password, the information regarding the use of electronic money, and the loss data to the electronic money ID.

The user name is the name entered by the user at the time of registration.

The IC chip ID is the IC chip ID stored after making the portable terminal 7 send the IC chip ID at the time of user registration.

The user ID and the loss lock password are the ID and the password used by the authentication section 58 to authenticate the user and are set by the user at the time of registration. The user ID and the loss lock password are used when user authentication is performed on the second terminal 9 that has requested the electronic money server 2 to perform loss processing (a loss lock request, a restoration request, an extraction request). Incidentally, in addition to the user IDs that are set individually, the user name, the e-mail address, or the like may be used as the user ID.

The loss lock flag is a flag based on which a determination is made as to whether or not the electronic money function section 12 of the corresponding electronic money ID is a subject of loss lock. The loss lock flag is OFF in a normal state in which loss lock processing is not performed.

Then, when a loss lock request is made, the loss processing section 60 turns on the loss lock flag, and loss data for the electronic money ID is created in the loss database 55.

The e-mail address is the e-mail address of the portable terminal and the e-mail address of the second terminal 9 to which information (such as notification to the effect that the state has shifted into various states) needed at the time of loss lock processing is sent from the electronic money server 2, and the e-mail address of the portable terminal and the e-mail address of the second terminal 9 are recorded in such a way that they can be distinguished from each other. The e-mail address of the second terminal 9 can be registered in advance at the time of user registration, but the e-mail address of the second terminal 9 can also be registered when a loss lock request is made.

When the e-mail address of the second terminal 9 is registered when a loss lock request is made, the electronic money server 2 determines whether or not the e-mail address of the second terminal 9 that made the loss lock request has been registered, and, if the e-mail address of the second terminal 9 that made the loss lock request is not registered, the electronic money server 2 requests the e-mail address and registers the sent e-mail address.

FIG. 6 is a diagram depicting an example of the logical configuration of the transaction information stored in the transaction information database 54.

The transaction information is formed of items such as an electronic money ID, a recharging record, a payment record, and so forth.

The electronic money ID is the electronic money ID read by the electronic money terminal 8 from the portable terminal at the time of radio communication. Moreover, when communication with the electronic money server 2 is performed via the Internet 4, the electronic money server 2 reads the electronic money ID from the portable terminal 7.

On the recharging record, a terminal ID of the electronic money terminal 8 that has performed recharging, the date and time of recharging, the amount of electronic money that has been added (the recharging amount), and so forth are recorded. Incidentally, when recharging is performed from the electronic money server 2 via the Internet 4, the IC chip ID of the portable terminal 7 is recorded in place of the terminal ID.

The payment record is formed of a terminal ID of the electronic money terminal 8 that has performed payment processing, the date and time of payment processing, the amount of electronic money by which payment processing has been performed (the payment amount), and so forth. When a payment by electronic money is made by using the electronic money server 2 via the Internet 4, the IC chip ID of the portable terminal 7 is recorded as the terminal ID.

Analysis of the transaction information stored in the transaction information database 54 by the transaction processing section 59 makes it possible to collect information that can be used for carrying out tasks such as distributing the cash collected from an issuer (an issuer of electronic money) among the member stores that have made a payment by electronic money and perform data mining such as market research by, for example, recording the product purchased by the user at the same time.

On the transaction information, in addition to the record of recharging and payment performed by normal processing, a case where a balance is extracted from the electronic money function section 12 of the portable terminal 7 on which loss lock has been set in this embodiment is also recorded as a payment by the electronic money server 2.

In this case, an ID for the electronic money server 2 is recorded as the terminal ID, and the date and time of extraction and the extracted amount (the payment amount) are also recorded.

FIG. 7 is a diagram depicting an example of the logical configuration of the loss database 55.

The loss database 55 is formed of items such as an electronic money ID, a fixed balance, a restoration standby flag, an extraction standby flag, an extraction completion flag, a balance processing method, and so forth and is managed on an electronic money ID-by-electronic money ID basis.

This loss database 55 is created and registered as loss data as a result of a user who has lost the portable terminal 7 making a loss lock request from the second terminal 9 and an electronic money ID identified by authentication of the user being recorded therein. As the loss data, an electronic money ID and a fixed balance are initially recorded, and then, in response to a request from the second terminal 9, rewriting of ON and OFF of each flag and a balance processing method are recorded.

The fixed balance is the balance of the electronic money balance area 36c, the balance directly checked from the electronic money function section 12 before the negative flag of the electronic money function section 12 of the target portable terminal 7 is turned off in loss lock request processing. The balance is usually fixed by compiling the transaction information that is sent from the electronic money terminal 8 for each electronic money ID, but the balance can be fixed at an early stage by directly checking the balance in loss lock request processing.

The restoration standby flag and the extraction standby flag are flags that indicate the state in which access from the lost portable terminal 7 is awaited after acceptance of the restoration request and the balance extraction request.

Even when the restoration request and the balance extraction request from the second terminal 9 are accepted, if there is not access from the lost portable terminal 7, it is not possible to turn off the negative flag of the electronic money function section 12 and perform balance extraction thereon.

Thus, they are flags for indicating a state of standby until there is access from the portable terminal 7.

The extraction completion flag is a flag that indicates the completion of balance extraction by reducing the electronic money balance of the electronic money function section 12 to zero by subtraction.

The balance processing method defines a method for delivering (a method by which the user collects) the balance (electronic money) extracted from the electronic money function section 12 by the balance extraction processing to the user, and various methods such as transferring the balance (electronic money) into a bank account designated by the user, adding the balance (electronic money) to another portable terminal (an electronic money function section 12), offsetting the balance (electronic money) with the communication and call charges of a designated portable terminal are offered. As the time at which one of these balance processing methods is designated, the method is designated in advance at the time of user registration or is designated when a balance extraction request is made; it is possible to make settings such that any one of those described above is adopted and both of them can be selected. When the method is allowed to be designated in advance at the time of user registration and when a balance extraction request is made, the electronic money server 2 determines whether or not the balance processing method is designated in advance in the balance extraction processing and, if the method is not designated, requests the user to designate the method from the second terminal 9 from which the request was sent.

However, in this embodiment in the descriptions, as for the balance processing method, the electronic money server 2 causes the second terminal 9 to urge the user to designate the balance processing method when a balance processing request is made and records the designated method as the balance processing method.

Figure 8:
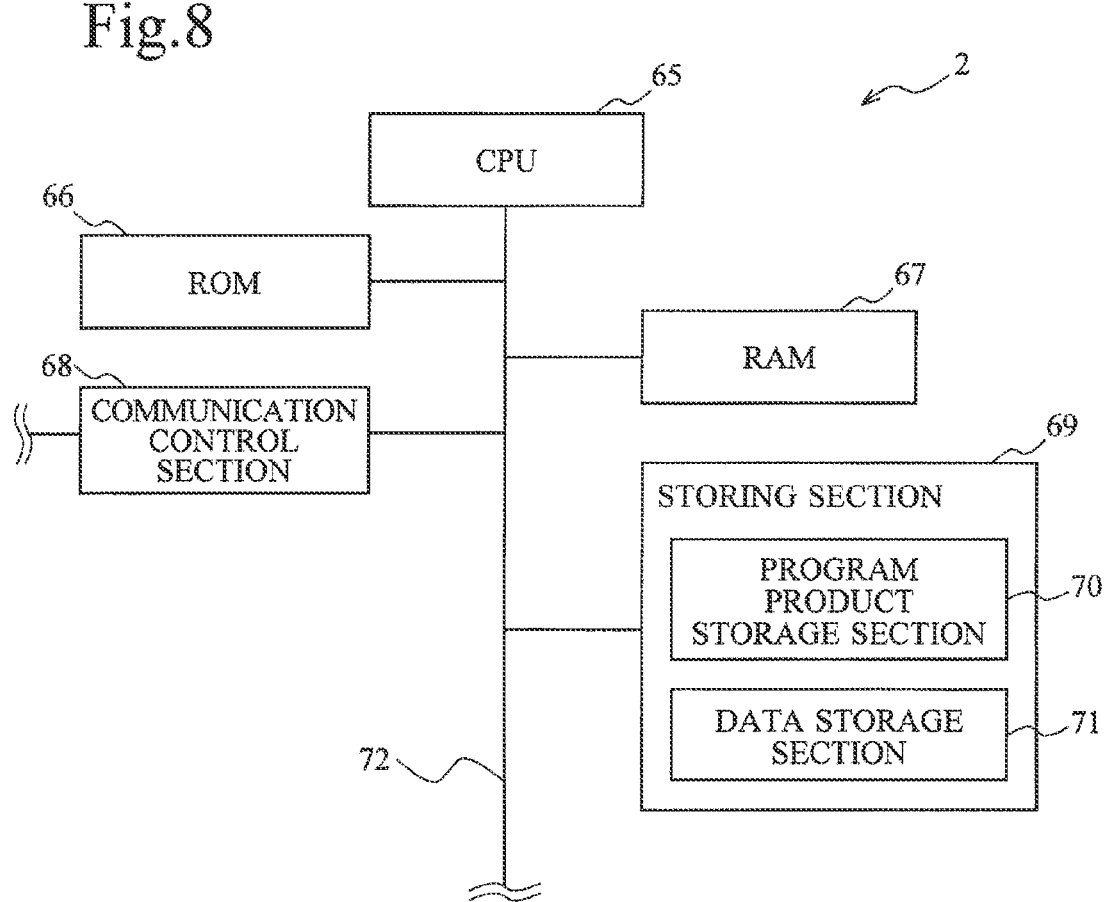
FIG. 8 is a diagram depicting an example of the hardware configuration of the electronic money server.

FIG. 8 is a diagram depicting an example of the hardware configuration of the electronic money server 2.

The electronic money server 2 is formed of a CPU 65, ROM 66, RAM 67, a communication control section 68, a storing section 69, and so forth which are connected to one another via a bus line 72.

In addition to performing information processing in accordance with a predetermined program product, the CPU 65 performs, for example, overall control of the electronic money server 2.

The ROM 66 is read-only memory, and a basic program product for making the electronic money server 2 operate, a parameter, and so forth are stored therein.

The RAM 67 is readable/writable memory, and provides a working area of the CPU 65 and loads and stores the program product and data stored in the storing section 69.

The communication control section 68 is a function section that performs communication with the portable terminal 7 and the second terminal 9 via the Internet 4 and the base station 5 and performs communication with the electronic money terminal 8 via the communication line.

The CPU 65 can receive information on the transaction performed between the electronic money terminal 8 and the portable terminal 7 from the electronic money terminal 8 and send various commands to the portable terminal 7 via the communication control section 68. Moreover, the CPU 65 can receive various requests related to loss lock processing from the second terminal 9 and send a response to the received request via the communication control section 68.

The storing section 69 is formed of, for example, a hard disk, other nonvolatile memory, or the like and is formed of a program product storage section 70 in which various program products are stored, a data storage section 71 in which data is stored, and so forth.

In the program product storage section 70, an OS which is a basic program product for making the electronic money server 2 function, a service site program product for operating a service site, a registration program product for performing user registration and so forth, an authentication program product for authenticating the user, a transaction processing program product for performing transaction processing, a loss lock processing program product for performing loss lock service processing, and other various program products are stored.

When these program products are executed in the CPU 65, the service site section 56, the user registration section 57, the authentication section 58, the transaction processing section 59, and the loss processing section 60 are configured in the form of software.

In the data storage section 71, the user information database 53, the transaction information database 54, the loss database 55, and other databases are stored.

Though not depicted in the drawing, the second terminal 9 includes a CPU, ROM, RAM, a communication control section, a storing section, and a display section, and the mode thereof is not limited to a particular mode as long as the second terminal 9 forms a computer system that can perform communication with the electronic money server 2. For example, the configuration that meets the above-described condition, such as a personal computer, a mobile telephone, a smartphone, a PHS, a tablet terminal, and an electronic organizer can function as the second terminal 9.

Moreover, as for the function of communication with the electronic money server 2, both wire and radio communications may be adopted and the mode thereof is not limited to a particular mode.

In the electronic money operation system 1 configured as described above, loss processing which is performed when the portable terminal 7 is lost will be described.

Incidentally, in this embodiment, although the procedure thereof is not depicted, advance registration for using the loss processing service has to be completed by the user registration section 57 of the electronic money server 2. That is, of the user information depicted in FIG. 5, a loss lock password corresponding to an electronic money ID has to be set in advance by the user registration section 57 based on the access from the portable terminal 7.

Figure 9:
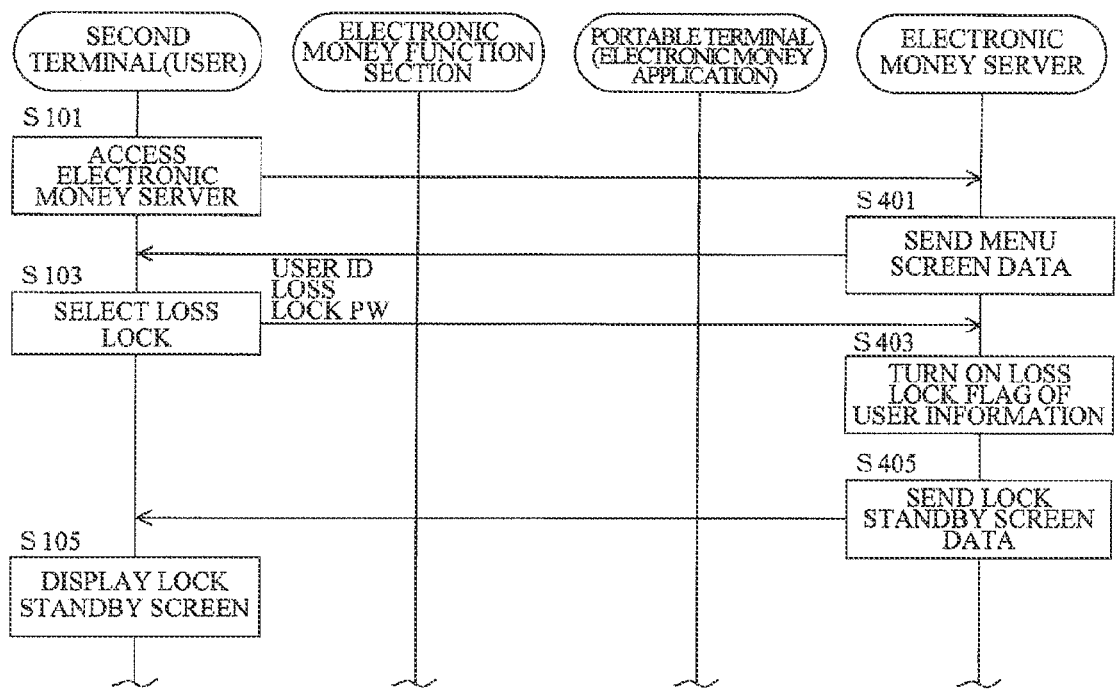
FIG. 9 is a flowchart describing loss lock request processing.

FIG. 9 is a flowchart describing loss lock request processing.

The user who has lost the portable terminal 7 accesses the service site of the electronic money server 2 from the second terminal 9 (step 101).

In response to this, when there is access from the second terminal 9, the electronic money server 2 sends menu screen data for displaying a menu screen to the second terminal 9 (step 401).

Sending of the menu screen data is performed by the service site section 56 of the electronic money server 2.

The second terminal 9 receives the menu screen data and displays the menu screen on the display.

The user selects a request for loss lock on the displayed menu screen and enters a user ID and a loss lock password, and the second terminal 9 sends the entered user ID and loss lock password to the electronic money server 2 along with the request for loss lock (step 103).

In the electronic money server 2, when receiving the request for loss lock and the user ID and the loss lock password from the second terminal 9, after authentication processing by the authentication section 58 is performed, the loss processing section 60 turns on the loss lock flag of the user information (FIG. 5) (step 403).

In this authentication processing associated with a request for loss lock, by performing a search for an electronic money ID with a user ID and a loss lock password that match the received user ID and loss lock password, an electronic money ID which is a loss object is identified. If there is not an electronic money ID that matches the received user ID and loss lock password, the authentication section 58 sends, to the second terminal 9, the authentication result indicating that authentication has not been performed successfully.

On the other hand, if an electronic money ID that matches the received user ID and loss lock password is identified and authentication has been performed successfully, the loss processing section 60 changes the loss lock flag of the user information (FIG. 5) corresponding to the appropriate electronic money ID to ON. Furthermore, the loss processing section 60 creates loss data corresponding to the electronic money ID in the loss database 55.

As a result of the loss lock flag being turned on, the electronic money server 2 shifts into lock standby state, and the service site section 56 of the electronic money server 2 sends lock standby screen data to the second terminal 9 (step 405). The electronic money server 2 which has shifted into the lock standby state awaits for access from the portable terminal 7 having a corresponding electronic money ID.

In the second terminal 9, when receiving the lock standby screen data, the second terminal 9 displays a lock standby screen on the display (step 105). On the lock standby screen, for example, with a message such as "the state has shifted into a standby state for processing by which the electronic money function section 12 is locked", the user is notified of the acceptance of the loss lock request and the state which will shift to a lock.

Figure 10:
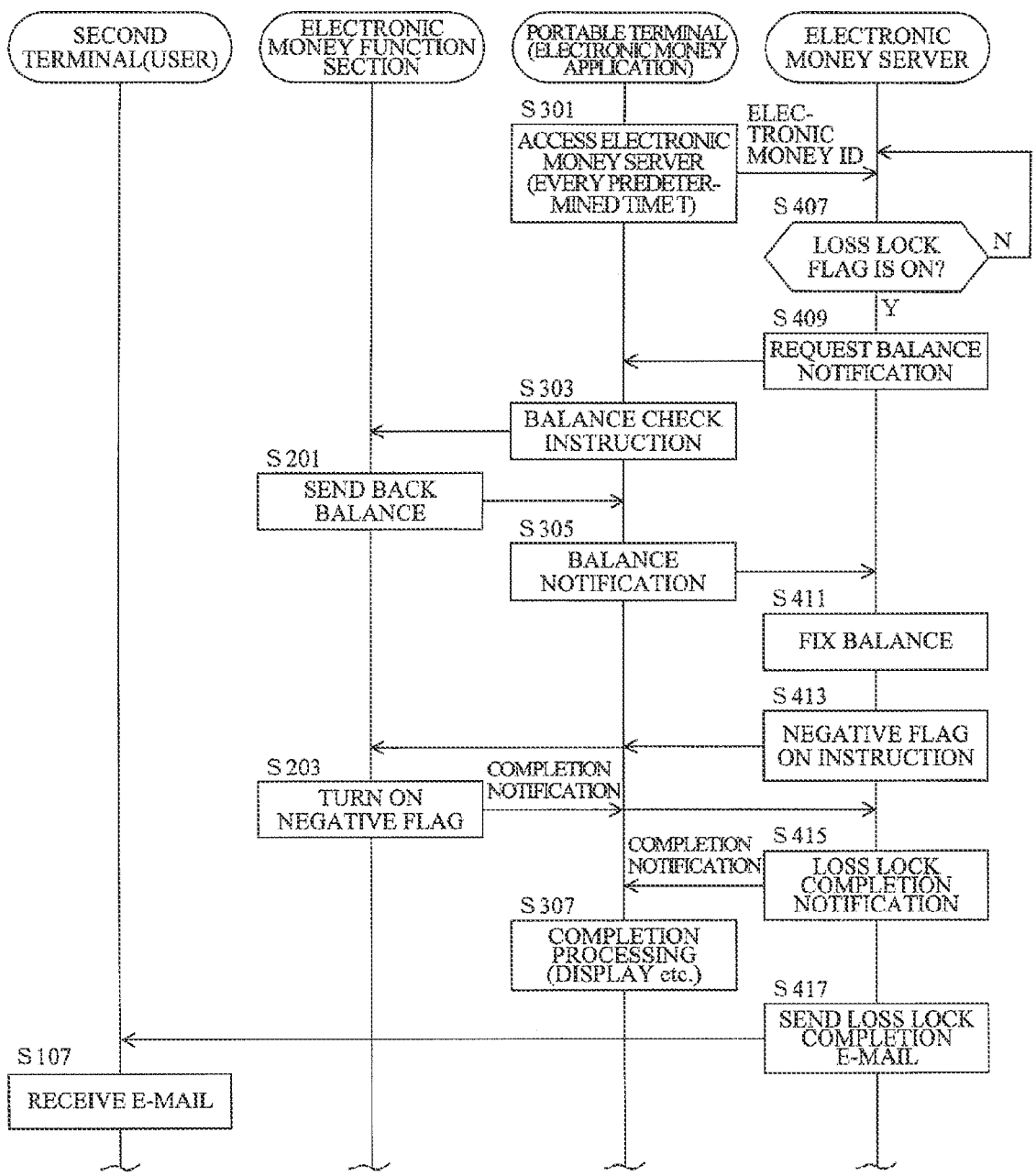
FIG. 10 is a flowchart describing loss lock processing which is performed after a lock standby state.

FIG. 10 is a flowchart describing loss lock processing which is performed after a lock standby state.

Since the application section 26 (an electronic money application) of the lost portable terminal 7 is set so as to access the electronic money server 2 every predetermined time T irrespective of an operation by a person (the user, a third party), the application section 26 accesses the electronic money server 2 at an appropriate time (step 301).

At the time of access to the electronic money server 2, the portable terminal 7 sends the electronic money ID of the electronic money function section 12 to the electronic money server 2.

In the electronic money server 2, when receiving the electronic money ID that is sent in response to the access from the portable terminal 7, the loss processing section 60 checks the user information corresponding to the electronic money ID and determines whether or not the loss lock flag is ON (step 407).

If the loss lock flag corresponding to the electronic money ID is not ON (step 407; N), the electronic money server 2 goes back to a state before the determination and awaits for access from the portable terminal 7.

On the other hand, if the loss lock flag corresponding to the electronic money ID is ON (step 407; Y), the loss processing section 60 of the electronic money server 2 requests balance notification from the portable terminal 7 which is making access (step 409).

In the portable terminal 7, when receiving a balance notification request, the portable terminal 7 issues a balance check instruction to the electronic money function section 12 by an electronic money application of the portable terminal 7 (hereinafter, referred to as an electronic money application 7) (step 303).

When receiving the balance check instruction, the electronic money function section 12 reads the balance from the electronic money balance area 36c and sends the balance back to the electronic money application (step 201).

The electronic money application 7 notifies the electronic money server 2 of the balance sent back from the electronic money function section 12 (step 305).

Incidentally, in the above description, a configuration is adopted in which the electronic money server 2 requests balance notification from the electronic money application 7 and, as a result of the electronic money application 7 checking the electronic money balance by issuing a balance check instruction to the electronic money function section 12 and notifying the electronic money server 2 of the electronic money balance, the electronic money server 2 obtains the balance of electronic money that is left in the electronic money balance area 36c.

On the other hand, the electronic money server 2 may directly issue a balance check instruction to the electronic money function section 12. The electronic money application 7 in this case functions as a relay unit that relays each received instruction to the electronic money function section 12 as it is as in the case where various instructions such as a negative flag ON instruction, a negative flag OFF instruction, and a subtraction instruction, which will be described later, are output from the electronic money server 2.

When receiving the balance of electronic money, the loss processing section 60 of the electronic money server 2 records the obtained balance on loss data (FIG. 7) of the electronic money ID as a fixed balance (step 411).

As described above, by directly checking the balance in the loss lock processing, it is possible to fix the balance at an early stage.

As a result, for example, it is possible to solve the problem of being impossible to grasp an accurate balance until the transaction information is obtained from the electronic money terminal 8 when an offline payment has been made by the electronic money terminal 8 before issuance of a loss lock request.

As described above, by fixing the balance at an early stage, it becomes possible to perform extraction processing at an early stage also when the user desires to extract the balance.

Moreover, the balance fixing processing (steps 409 to 411) is performed before the following negative flag ON processing (processing after step 413) that is performed on the electronic money function section 12.

After the negative flag of the electronic money function section 12 is turned on, since checking of a balance can be performed only after the negative flag is turned off again based on an instruction from the electronic money server 2, by performing balance fixing processing first in the loss lock processing, it is possible to simplify and speed up the processing.

After the balance fixing processing, the loss processing section 60 sends a negative flag ON instruction for the electronic money function section 12 (step 413).

This negative flag ON instruction is sent from the electronic money server 2 to the portable terminal 7, and, as for the various "instructions" from the electronic money server 2, the electronic money application of the application section 26 relays the received "instruction" to the electronic money function section 12 as it is. This relay performed by the electronic money application 7 is performed in a similar manner on completion notification of processing performed in response to the "instruction" from the electronic money server 2.

Also in the other drawings, when the electronic money application 7 performs relay in connection with the "instruction" from the electronic money server 2, the relay state is expressed by also attaching an arrow to the portable terminal 7 in the flowchart, and descriptions will be given with this relay being omitted as processing between the electronic money server 2 and the electronic money function section 12.

In the electronic money function section 12, when receiving the negative flag ON instruction from the electronic money server 2, the electronic money function section 12 rewrites the negative flag of the negative flag area 36d of the storing section 36 from OFF to ON and then provides completion notification to the electronic money server 2 (step 203).

When receiving the negative flag ON completion notification, the electronic money server 2 notifies the electronic money application 7 of loss lock completion (step 415).

When receiving the loss lock completion notification, the electronic money application 7 performs completion processing (step 307).

As this completion processing, there is, for example, processing by which notification to the effect that lock is completed is provided by the display section 46 and a particular function (such as balance inquiry) of the electronic money application 7 is disabled by lock.

However, since the user him/herself cannot check the notification because the portable terminal is lost, there is no need to perform display, but, in order to prevent unauthorized use by a third party who got the portable terminal, notification to the effect that lock has been already set and electronic money cannot be used may be provided.

When loss lock set on the electronic money function section 12 is completed, the electronic money server 2 reads the e-mail address (which is often the e-mail address of the second terminal 9 that has made the loss lock request, but other e-mail addresses may be used) registered in the user information of the corresponding electronic money ID and sends e-mail saying that loss lock set on the electronic money function section 12 (the portable terminal 7) in the lock standby state is completed (step 417). Incidentally, the electronic money server 2 obtains the e-mail address of the second terminal 9 at the time of registration of a loss service, but the electronic money server 2 may obtain the e-mail address from the second terminal 9 when a loss lock request is made. Since this e-mail address is used to provide various notifications such as completion to the user, it is also possible to use the e-mail address of a second terminal 9 other than the second terminal 9 that has made the loss lock request.

When the second terminal 9 receives loss lock completion e-mail, the user of the second terminal 9 recognizes the completion of loss lock by displaying the e-mail received from the electronic money server 2 on the screen (step 107).

As a result of the loss lock set on the electronic money function section 12 having been completed, the third party who got the lost portable terminal 7 and the user him/herself cannot make a payment using the electronic money function section 12.

Figure 11:
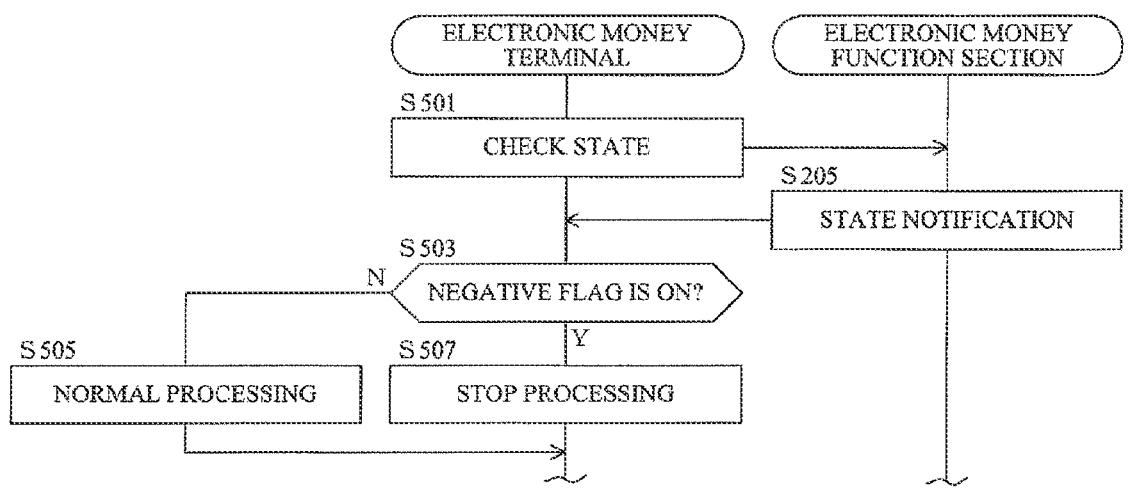
FIG. 11 is a flowchart describing processing which is performed when an electronic money function section on which loss lock has been set is used.

FIG. 11 is a flowchart describing processing which is performed when the electronic money function section 12 on which loss lock has been set is used.

When an owner of the portable terminal 7 makes a payment by electronic money with the electronic money terminal 8, the electronic money terminal 8 checks the state by notifying the electronic money function section 12 of a state check instruction from the reader/writer 8*a* (step 501).

In response to this state check, the electronic money function section 12 reads state information including the flag state of the negative flag area 36*d* and notifies the electronic money terminal 8 of the state (step 205).

The electronic money terminal 8 determines whether or not the negative flag is ON based on the state notified from the electronic money function section 12 (step 503).

Then, if the negative flag of the electronic money function section 12 is OFF (step 503; N), the electronic money terminal 8 performs normal processing (step 505).

That is, the electronic money terminal 8 issues, to the electronic money function section 12, an instruction to subtract electronic money corresponding to the input payment amount if payment processing is performed and issues, to the electronic money function section 12, an instruction to add electronic money corresponding to the recharging amount if recharging processing is performed.

In the electronic money function section 12, the electronic money function section 12 adds or subtracts electronic money according to an addition or subtraction instruction to or from the electronic money balance area.

On the other hand, if the negative flag of the electronic money function section 12 is ON (step 503; Y), the electronic money terminal 8 cancels the subsequent processing and ends the processing (step 507). In so doing, the electronic money terminal 8 may notify the holder of the portable terminal 7 of the end of processing by displaying the end of processing on the screen.

As described above, by bringing the negative flag of the electronic money function section 12 into an ON state in loss lock processing, unauthorized use of electronic money by a third party is prevented.

Next, processing by which the original state of the electronic money function section 12 is restored by turning off the negative flag of the electronic money function section 12 when the lost portable terminal 7 is found will be described.

Figure 12:
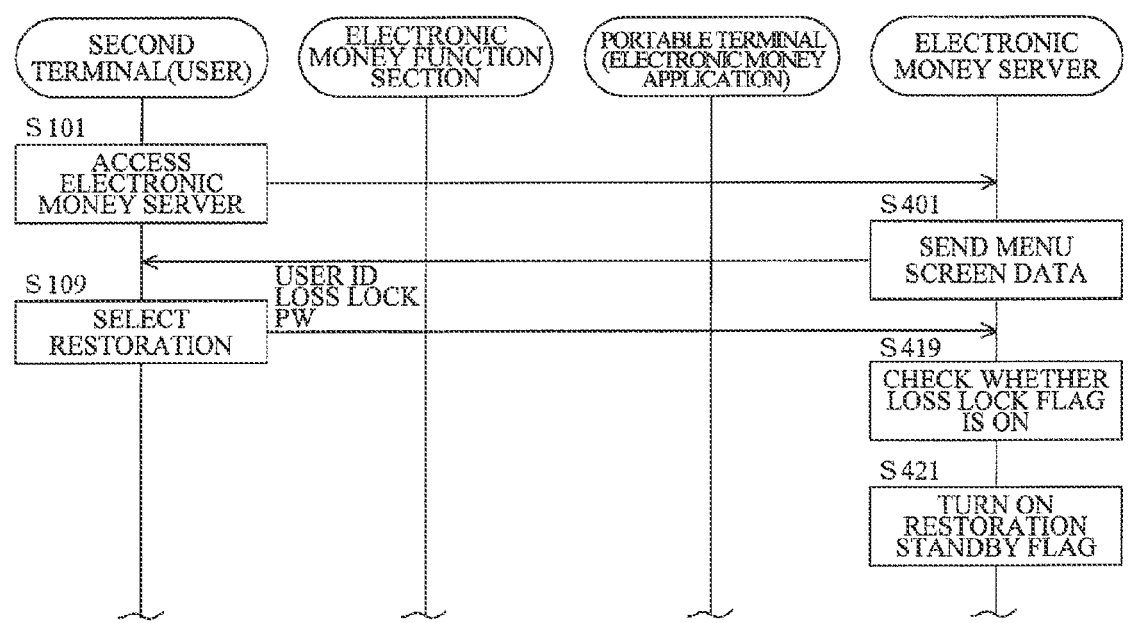
FIG. 12 is a flowchart describing restoration request processing by which the user makes a restoration request from a second terminal.

FIG. 12 is a flowchart describing restoration request processing by which the user makes a restoration request from the second terminal 9.

The user who has found the portable terminal 7 accesses the electronic money server 2 by operating the second terminal 9 (step 101), and the electronic money server 2 sends menu screen data to the second terminal 9 based on this access (step 401). Though not described, the details of the above processing are the same as those of steps 101 and 401 of FIG. 9 identified with the same step numbers as those in this drawing. Hereinafter, the same processing is identified with the same step number and the description thereof will be omitted as appropriate.

When receiving the menu screen data, the second terminal 9 displays the menu screen on the display.

The user selects a restoration request on the displayed menu screen and enters a user ID and a loss lock password, and the second terminal 9 sends the entered user ID and loss lock password to the electronic money server 2 along with the restoration request (step 109).

In the loss processing section 60 of the electronic money server 2, when receiving the request for loss lock and the user ID and the loss lock password from the second terminal 9, after performing authentication processing by the authentication section 58 in a manner similar to the authentication (step 403) in the loss lock request processing of FIG. 9, the loss processing section 60 checks whether or not the loss lock flag is ON based on the user information (FIG. 5) corresponding to the electronic money ID identified in the authentication processing (step 419).

If the loss lock flag is not ON, since loss lock processing is not performed, the loss processing section 60 provides notification to the effect that it is not a subject of restoration to the second terminal 9 (not depicted in the drawing) and ends the processing.

On the other hand, if ON of the loss lock flag is confirmed (step 419; Y), the electronic money server 2 turns on the restoration standby flag of the loss data (FIG. 7) corresponding to the electronic money ID and ends the processing (step 421). Then, the electronic money server 2 waits until the processing shifts to restoration processing.

Incidentally, in the loss lock request processing described in FIG. 9, the electronic money server 2 notifies the second terminal 9 of a shift into a standby state by sending lock standby screen data to the second terminal 9.

On the other hand, in the restoration processing, since this processing is based on the assumption that the portable terminal is already found, the restoration processing which will be described later is performed quickly, which makes it possible for the user to know the completion of restoration with the portable terminal 7 and the second terminal 9, and therefore the electronic money server 2 does not send restoration standby screen data to the second terminal 9 after turning on the restoration standby flag (step 421). This makes it possible to reduce the load on the electronic money server 2.

However, the electronic money server 2 may send restoration standby screen data to the second terminal 9 after turning on the restoration standby flag (step 421).

Figure 13:
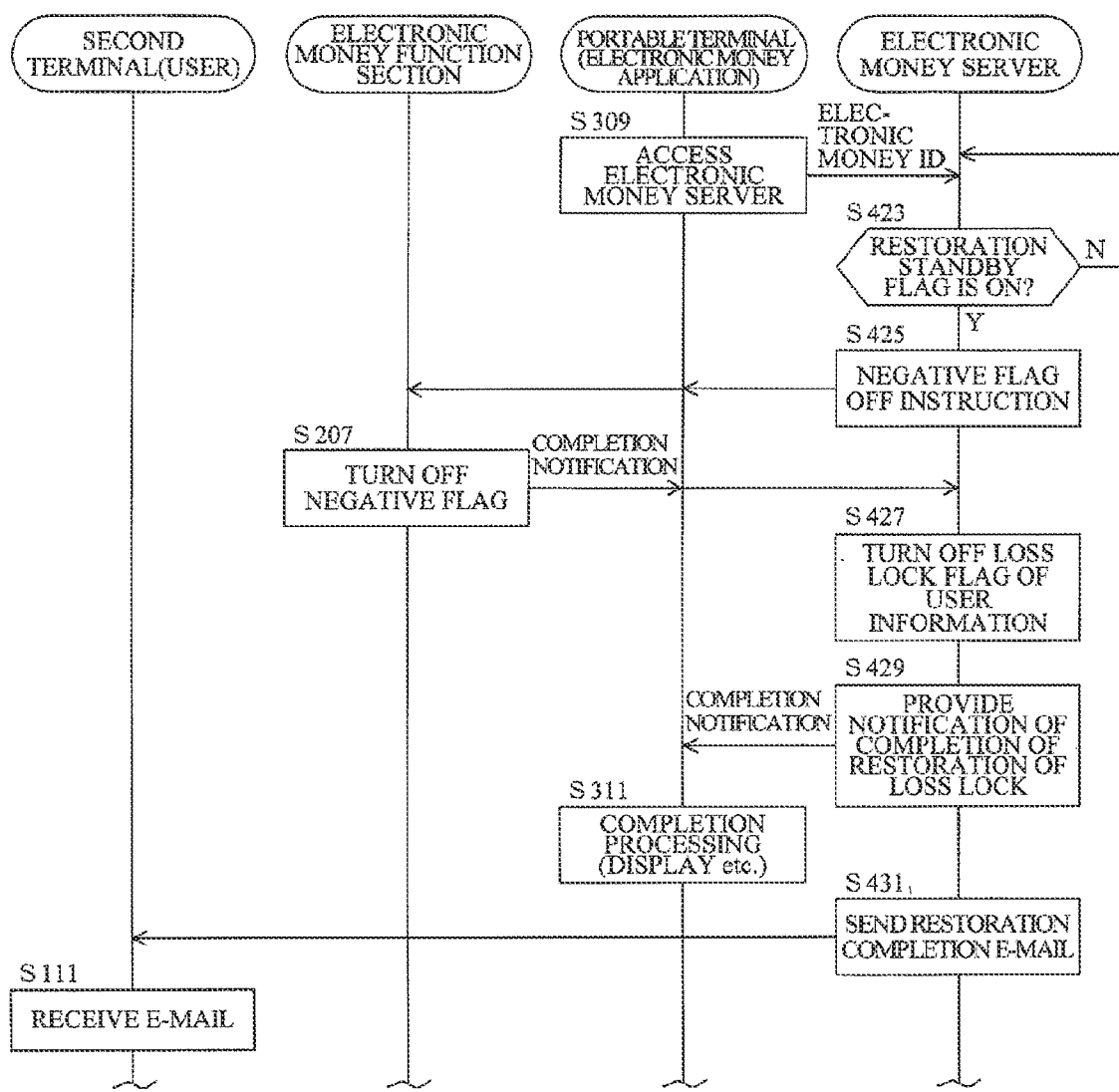
FIG. 13 is a flowchart describing restoration processing which is performed after the state shifts into a restoration standby state.

FIG. 13 is a flowchart describing restoration processing which is performed after the state shifts into a restoration standby state.

The application section 26 (the electronic money application 7) of the found portable terminal 7 accesses the electronic money server 2 every predetermined time T again by user operation (step 309). At the time of this access to the electronic money server 2, the portable terminal 7 sends the electronic money ID of the electronic money function section 12 to the electronic money server 2.

In the electronic money server 2, when receiving the electronic money ID sent as a result of being accessed from the portable terminal 7, the electronic money server 2 checks the loss data (FIG. 7) corresponding to the electronic money ID and determines whether or not the restoration standby flag is ON (step 423).

If the restoration standby flag corresponding to the electronic money ID is not ON (step 423; N), the electronic money server 2 goes back to a state before the determination and awaits for access from the portable terminal 7.

On the other hand, if the restoration standby flag corresponding to the electronic money ID is ON (step 423; Y), the loss processing section 60 of the electronic money server 2 sends a negative flag OFF instruction to the electronic money function section 12 of the portable terminal 7 which is making access (step 425).

In the electronic money function section 12, when receiving the negative flag OFF instruction from the electronic money server 2, the electronic money function section 12 rewrites the negative flag of the negative flag area 36*d* of the storing section 36 from ON to OFF and then provides completion notification to the electronic money server 2 (step 207).

When receiving the negative flag OFF completion notification, the electronic money server 2 changes the loss lock flag of the user information (FIG. 5) corresponding to the electronic money ID from ON to OFF (step 427). In so doing, the electronic money server 2 may also change the restoration standby flag of the loss data (FIG. 7) from ON to OFF.

Next, the electronic money server 2 notifies the electronic money application 7 of the completion of restoration of loss lock (step 429).

When receiving the restoration completion notification, the electronic money application 7 performs completion processing (step 311).

As the completion processing, the electronic money application 7 performs, for example, processing by which notification to the effect that restoration from the locked state is completed is provided by the display section 46 and a particular function (such as balance inquiry) of the electronic money application 7, the particular function disabled by lock, is enabled again.

As a result of the restoration notification being displayed on the display section 46, the user can recognize the completion of restoration to original state by viewing the display on the portable terminal 7.

When restoration from the state of loss lock set on the electronic money function section 12 is completed, the electronic money server 2 reads the e-mail address (in this embodiment, it is assumed that the e-mail address of the second terminal 9 that has made the loss lock request is registered) registered in the user information of the corresponding electronic money ID and sends e-mail saying that restoration of loss lock set on the electronic money function section 12 (the portable terminal 7) in the locked state is completed (step 431).

When receiving the restoration completion e-mail with the second terminal 9, the user of the second terminal 9 recognizes the completion of restoration of the electronic money function section 12 to original state by displaying the e-mail received from the electronic money server 2 on the screen by user operation (step 111).

As described above, according to this embodiment, when the portable terminal 7 is lost, since it is possible to turn off the negative flag of the electronic money function section 12 only by accessing the electronic money server 2 from the second terminal 9, sending information (in the embodiment, a user ID and a loss lock password) by which an electronic money ID can be identified, and making a loss lock request, the electronic money balance of the electronic money balance area 36*c* is brought into an unusable state with the original state thereof being maintained, which makes it possible to prevent easily unauthorized use by a third party.

On the other hand, since the electronic money balance of the electronic money balance area 36*c* maintains the original state, also when the portable terminal 7 is found, only by accessing the electronic money server 2 from the second terminal 9, sending information (in the embodiment, a user ID and a loss lock password) by which an electronic money ID can be identified, and making a restoration request, it is possible to restore the electronic money function section 12 while mainlining the original state thereof at the time of loss.

In the loss service according to this embodiment, when the lost portable terminal 7 is found later, the original state at the time of loss is restored by restoration processing; if the portable terminal 7 is not found after a lapse of a predetermined period, it is also possible to extract the electronic money balance in the electronic money function section 12 and return it to the user.

Figure 14:
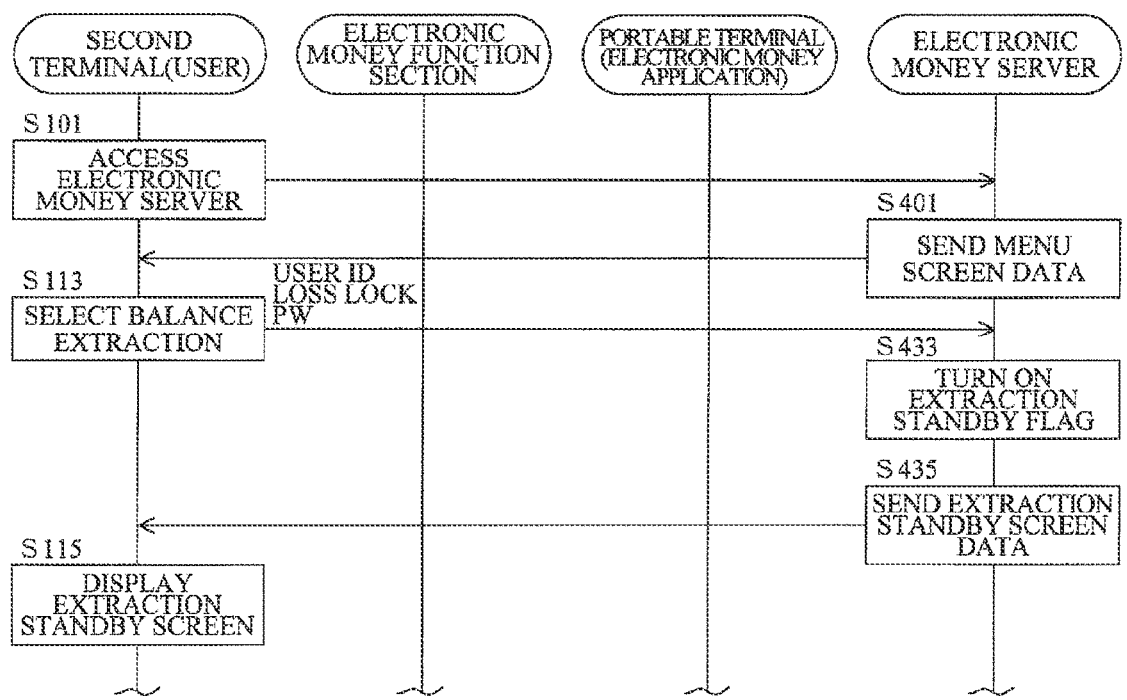
FIG. 14 is a flowchart describing balance extraction request processing which is performed when the user makes, from the second terminal, a request to extract a balance.

FIG. 14 is a flowchart describing balance extraction request processing which is performed when the user makes, from the second terminal 9, a request to extract a balance.

The user who has lost the portable terminal 7 and desires a method other than restoration to original state accesses the electronic money server 2 from the second terminal 9 (step 101), and, based on this access, the electronic money server 2 sends menu screen data to the second terminal 9 (step 401).

When receiving the menu screen data, the second terminal 9 displays a menu screen on the display.

The user selects balance extraction on the displayed menu screen and enters a user ID and a loss lock password, and the second terminal 9 sends the entered user ID and loss lock password to the electronic money server 2 along with a balance extraction request (step 113).

In the loss processing section 60 of the electronic money server 2, when receiving the balance extraction request, the user ID, and the loss lock password from the second terminal 9, after performing authentication processing by the authentication section 58 in a manner similar to the authentication (step 403) in the loss lock request processing of FIG. 9, the loss processing section 60 turns on an extraction standby flag of the loss data (FIG. 7) corresponding to the electronic money ID identified in the authentication processing (step 433).

Incidentally, as is the case with the restoration request processing described in FIG. 12, the loss processing section 60 may check whether or not the loss lock flag of the user information (FIG. 5) is ON, and, if the loss lock flag is OFF, since loss lock processing is not performed, the loss processing section 60 may end the processing after providing notification to the effect that it is not a subject of extraction processing to the second terminal 9; if the loss lock flag is ON, the loss processing section 60 may turn on the extraction standby flag.

The electronic money server 2 shifts into extraction standby state by turning on the extraction standby flag and sends extraction standby screen data to the second terminal 9 (step 435). The electronic money server 2 that has shifted into an extraction standby state awaits for access from the portable terminal 7 having a corresponding electronic money ID.

In the second terminal 9, when receiving the extraction standby screen data, the second terminal 9 displays an extraction standby screen on the display (step 115). On the extraction standby screen, with a message such as "the state has shifted into a standby state for processing by which the balance of electronic money is collected", the user is notified of the acceptance of the balance extraction request and the state which will shift to extraction processing.

Figure 15:
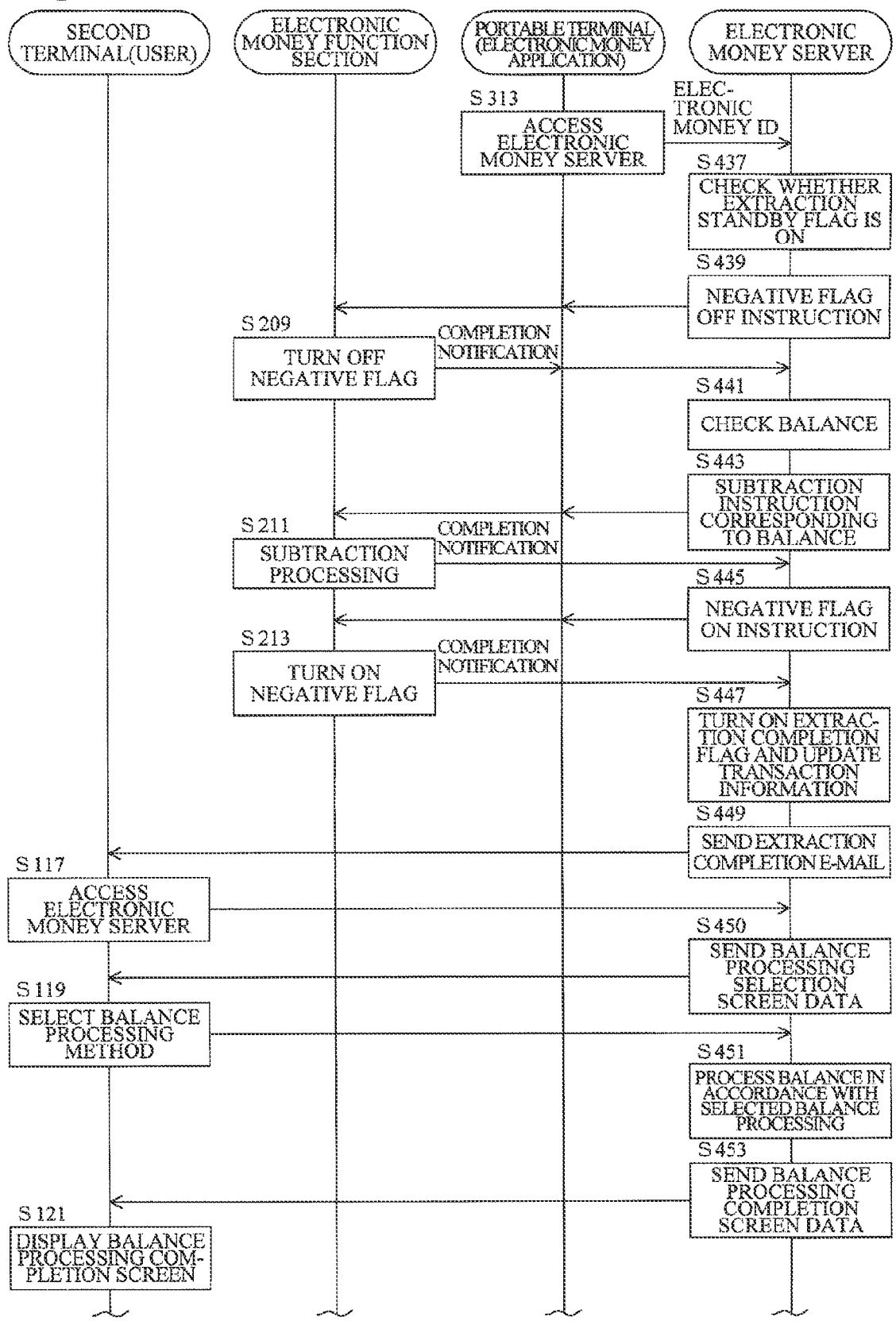
FIG. 15 is a flowchart describing extraction processing which is performed after the state shifts into an extraction standby state.

FIG. 15 is a flowchart describing extraction processing which is performed after the state shifts into the extraction standby state.

The application section 26 (the electronic money application 7) of the lost portable terminal 7 accesses the electronic money server 2 every predetermined time T (step 313) and sends the electronic money ID of the electronic money function section 12 to the electronic money server 2.

In the electronic money server 2, when receiving the second terminal ID sent by access from the portable terminal 7, the electronic money server 2 checks the loss data (FIG. 7) corresponding to the electronic money ID and determines whether or not the extraction standby flag is ON (step 437).

If the extraction standby flag corresponding to the electronic money ID is not ON (step 437; N), the electronic money server 2 goes back to a state before the determination and awaits for access from the portable terminal.

On the other hand, if the extraction standby flag corresponding to the electronic money ID is ON (step 437; Y), the loss processing section 60 of the electronic money server 2 sends a negative flag OFF instruction to the electronic money function section 12 of the portable terminal 7 which is making access (step 439).

This is performed to lift the locked state of the electronic money function section 12 and make it possible for the electronic money function section 12 to extract the balance (perform subtraction processing) because the electronic money function section 12 is currently in the loss lock state and cannot perform subtraction processing.

In the electronic money function section 12, when receiving a negative flag OFF instruction from the electronic money server 2, after rewriting the negative flag of the negative flag area 36*d* of the storing section 36 from ON to OFF, the electronic money function section 12 provides completion notification to the electronic money server 2 (step 209).

When receiving the negative flag OFF completion notification, the electronic money server 2 reads the balance corresponding to the electronic money ID, the balance fixed by the balance fixing processing (steps 409 to 411 of FIG. 10), from the loss data (FIG. 7) and checks the balance (step 441).

Incidentally, if an embodiment in which the balance check processing is not performed in FIG. 10 is adopted, since the negative flag is turned off in the processing in steps 439 and 209, the balance fixing processing (steps 409 to 411) is performed in this balance check (step 411).

Next, the electronic money server 2 sends a subtraction instruction corresponding to the checked balance of electronic money to the electronic money function section 12 (step 443).

In the electronic money function section 12, when receiving the subtraction instruction from the electronic money server 2, the electronic money function section 12 performs subtraction on the electronic money of the electronic money balance area 36*c* of the storing section 36 by executing the subtraction instruction. Here, since this instruction is a subtraction instruction to reduce the amount corresponding to the balance, the balance after the subtraction processing becomes zero. After the subtraction processing, the electronic money function section 12 provides subtraction processing completion notification to the electronic money server 2 (step 211).

When receiving the subtraction processing completion notification, the electronic money server 2 sends a negative flag ON instruction to the electronic money function section 12 to return the electronic money function section 12 to the loss lock state again (step 445), and, in the electronic money function section 12, after changing the negative flag area 36*d* to negative flag ON in accordance with the instruction, the electronic money function section 12 provides completion notification to the electronic money server 2 (step 213).

As described above, by turning on the negative flag again after extracting the balance of electronic money, it is possible, not only to prevent the use of the balance, but also to disable the electronic money function itself also after extraction of the balance.

Incidentally, since the electronic money balance has already been extracted, it is also possible to keep the negative flag OFF state without turning on the negative flag again. This makes it possible to simplify the processing and reduce the load on the server.

When receiving the negative flag ON completion notification, the electronic money server 2 turns on the extraction completion flag of the loss data (FIG. 7), the extraction completion flag corresponding to the electronic money ID, and updates the transaction information (FIG. 6) (step 447).

Update of the transaction information is performed as recording of the electronic money balance extraction as a payment by the electronic money server 2; the ID of the electronic money server 2 is recorded on the terminal ID, the extraction date and time is recorded on the payment date and time, and the extracted balance is recorded on the payment amount.

Incidentally, by turning on the extraction completion flag, the amount of the fixed balance recorded on the loss data is regarded as the extracted electronic money.

Incidentally, both the processing in step 447 and the processing in step 445 are performed after the subtraction completion notification from the electronic money function section 12, and any one of the processing in step 447 and the processing in step 445 may be performed before the other.

When both processing (steps 447, 445) is completed, the electronic money server 2 reads the e-mail address registered in the user information corresponding to the electronic money ID, sends extraction completion e-mail to the second terminal 9 (step 449), and awaits for access from the second terminal 9.

The second terminal 9 that has received the extraction completion e-mail accesses the electronic money server 2 in a manner similar to step 101 by user operation (step 117).

The electronic money server 2 sends balance processing selection screen data to the second terminal 9 that has made access thereto, in order to make the user select a method for returning the electronic money extracted as the balance (step 450).

In the second terminal 9, the second terminal 9 displays the received balance processing selection screen and sends the balance processing method selected by the user to the electronic money server 2 (step 119).

Here, as the balance processing method (the method for returning the balance) that can be selected by the user, there are various methods such as transferring the balance into a bank account designated by the user, adding the balance to another portable terminal (electronic money function section 12), offsetting the balance with the communication and call charges of a designated portable terminal.

The electronic money server 2 records the balance processing method that is sent from the second terminal 9 on the loss data corresponding to the electronic money ID and performs processing by which the balance is returned to the user at the right time (step 451).

Then, the electronic money server 2 sends balance processing completion screen data to the second terminal 9 (step 453).

In the second terminal 9, the second terminal 9 displays a balance processing completion screen in accordance with the received balance processing completion screen data and notifies the user of balance processing completion (step 121).

As described above, in the electronic money system of this embodiment, any one of selection by which the electronic money function section 12 on which loss lock has been set is restored to the original state at the time of loss lock by restoration processing, selection by which the electronic money function section 12 on which loss lock has been set is made to stay in the locked state, and selection by which return of the balance is requested by extraction processing can be selected according to the user's wishes.

Next, a second embodiment of the electronic money system will be described.

In the first embodiment, the function of the electronic money function section 12 is locked when the portable terminal 7 is lost; in the second embodiment, the electronic money function section 12 is brought into a locked state (hereinafter referred to as user lock) in advance in case the portable terminal 7 is lost and, when the user uses the electronic money function section 12 to perform recharging or payment, user lock is released (hereinafter referred to as unlock).

Hereinafter, user lock and unlock are collectively referred to as a user lock function, which is implemented by changing ON and OFF of a negative flag as in the loss lock function.

If the portable terminal 7 (the electronic money function section 12) that is provided with this user lock function and is in the user lock state is lost, there is a possibility of the unauthorized use of the electronic money balance as a result of a third party performing unlock.

Therefore, in the second embodiment, in the loss lock request processing, unlock is prohibited so that negative flag ON of the electronic money function section 12 is not changed to negative flag OFF.

In the electronic money system in the second embodiment, the electronic money application of the telephone function section 10 is provided with the user lock function and stores a user lock password and the user information (FIG. 5) of the electronic money server 2 includes flag areas for a user lock flag and an unlock prohibition flag, and the other configurations are the same as those of the first embodiment.

To use this user lock function, the user enables the user lock function of the electronic money application and enters a user lock password by operating the portable terminal 7. The entered user lock password is stored in the storing section 45 of the telephone function section 10.

Furthermore, the electronic money application accesses the electronic money server 2 and registers the user lock function in the electronic money server 2. At the time of this user lock registration, the electronic money ID is sent to the electronic money server 2 from the portable terminal 7, and, in the electronic money server 2, in the user information corresponding to the received electronic money ID, the electronic money server 2 registers the user lock password and secures the user lock flag and unlock prohibition flag areas.

Hereinafter, user lock processing, loss lock request processing, and unlock processing in the second embodiment will be described.

Figure 16:
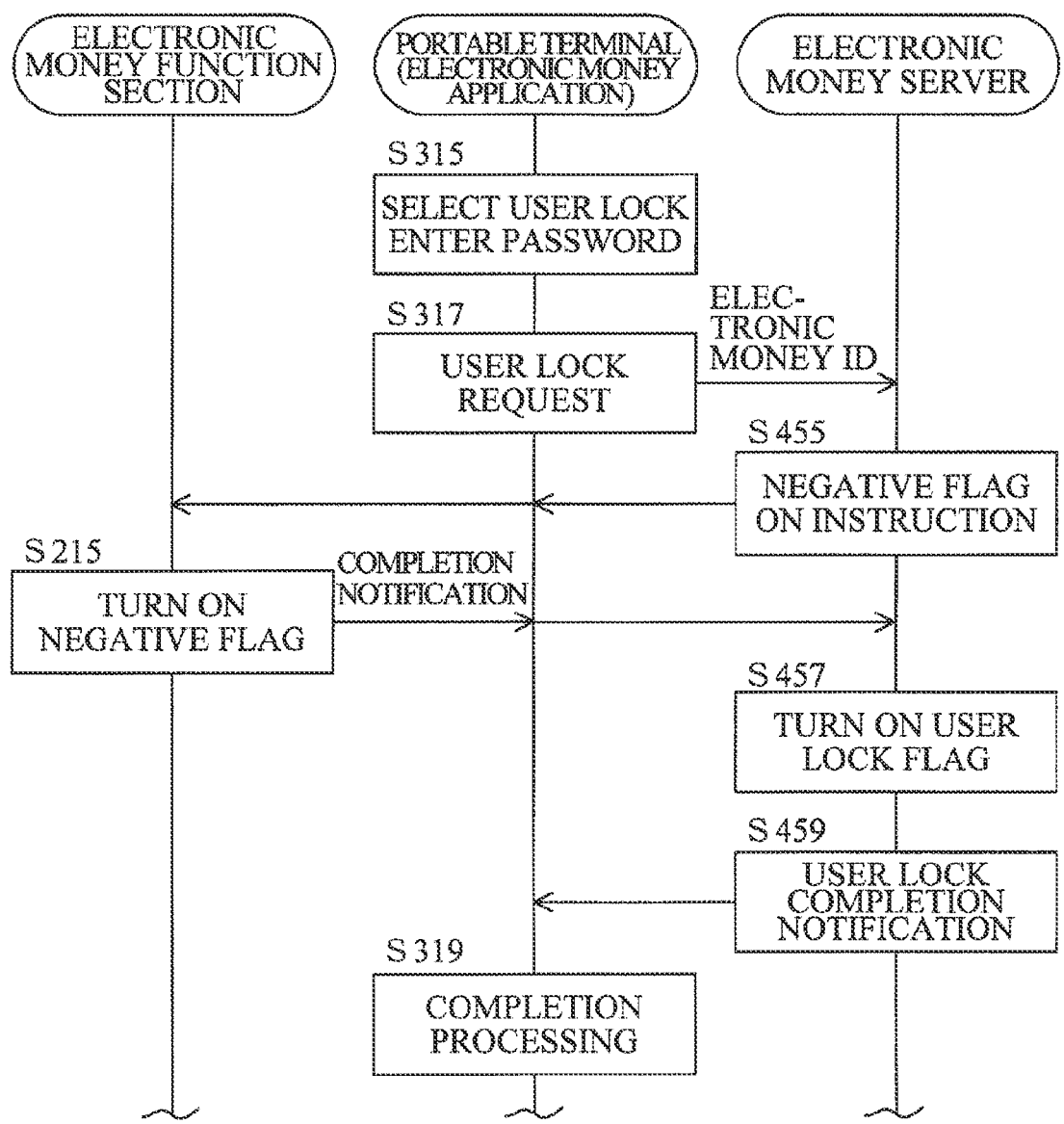
FIG. 16 is a flowchart describing user lock processing.

FIG. 16 is a flowchart describing user lock processing.

To set user lock on the electronic money function section 12, the user starts the electronic money application 7, and, since a password entry screen is displayed when the user selects user lock, the user enters a user lock password (step 315). The electronic money application 7 checks whether or not the entered user lock password matches the user lock password registered in the storing section 45 in advance. If the entered user lock password does not match the user lock password registered in the storing section 45 in advance, the electronic money application 7 performs error processing; if the entered user lock password matches the user lock password registered in the storing section 45 in advance, the electronic money application 7 accesses the electronic money server 2 and makes a user lock request by sending the electronic money ID thereto (step 317).

When receiving the user lock request, the electronic money server 2 sends a negative flag ON instruction to the electronic money function section 12 (step 455).

When receiving the negative flag ON instruction from the electronic money server 2, the electronic money function section 12 rewrites the negative flag of the negative flag area 36*d* of the storing section 36 from OFF to ON and then provides completion notification to the electronic money server 2 (step 215).

When receiving the negative flag ON completion notification, the electronic money server 2 turns on the user lock flag of the user information corresponding to the electronic money ID (step 457) and sends user lock completion notification to the electronic money application 7 (step 459).

When receiving the user lock completion notification, the electronic money application 7 performs completion processing by providing an announcement to the effect that user lock is completed (step 319).

By the above user lock processing, before the portable terminal 7 is lost, the negative flag of the electronic money function section 12 is set to ON. As a result, as described in FIG. 11 in the first embodiment, even when an attempt to perform recharging or payment with the electronic money terminal 8 is made, the processing is stopped (FIG. 11, step 507).

Figure 17:
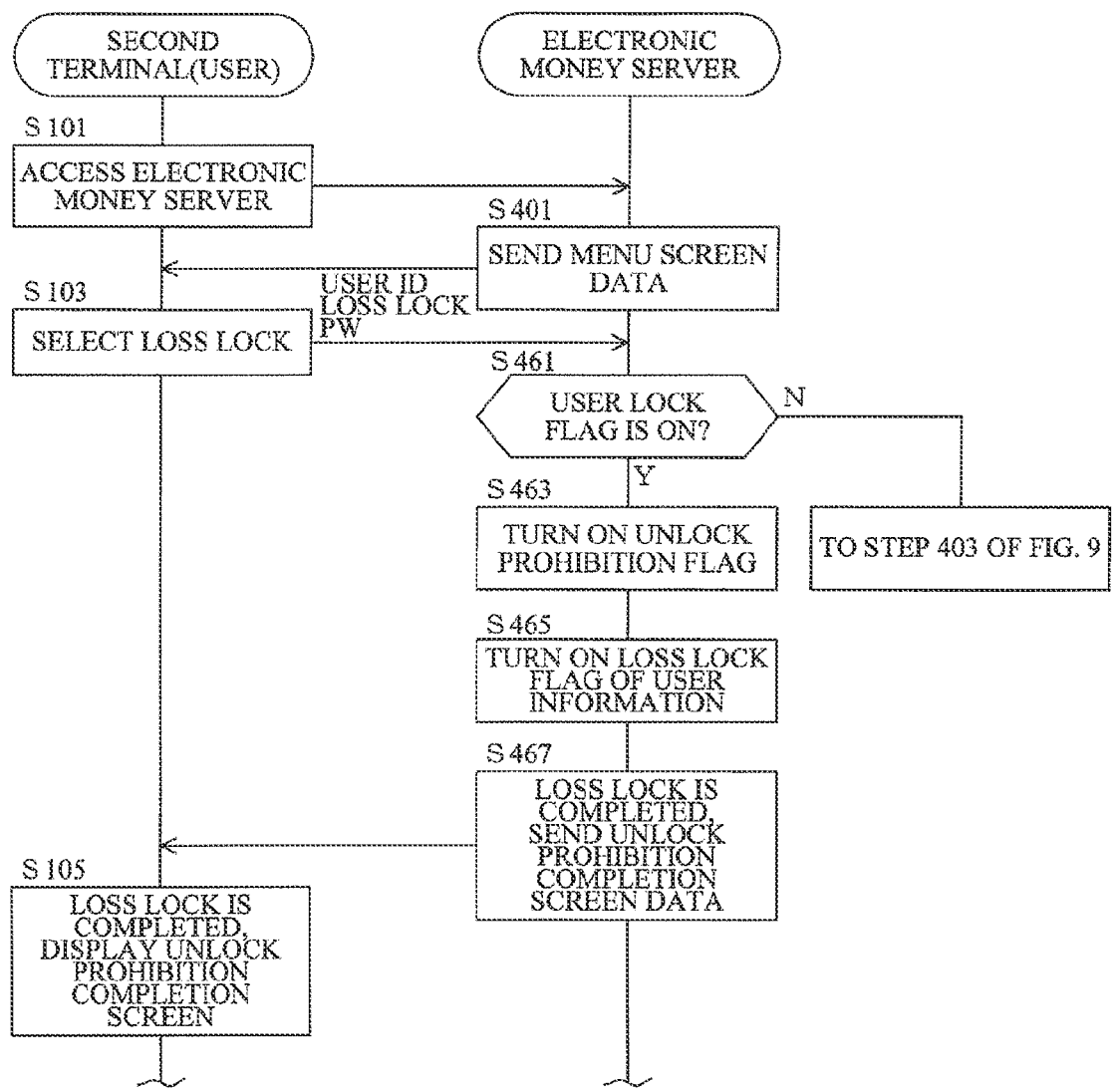
FIG. 17 is a flowchart describing loss lock request processing in a second embodiment.

FIG. 17 is a flowchart describing loss lock request processing in the second embodiment.

The user who has lost the portable terminal 7 and desires a method other than restoration to original state accesses the electronic money server 2 from the second terminal 9 (step 101), and, based on this access, the electronic money server 2 sends menu screen data to the second terminal 9 (step 401).

When receiving the menu screen data, the second terminal 9 displays a menu screen on the display. Then, the user selects loss lock processing on the displayed menu screen and enters a user ID and a loss lock password, and the second terminal 9 sends the entered user ID and loss lock password to the electronic money server 2 along with the loss lock request (step 103).

The above processing is the same as those performed in steps 101, 401, and 103 described in FIG. 9.

In the electronic money server 2, when receiving the loss lock request, the user ID, and the loss lock password from the second terminal 9, the electronic money server 2 performs authentication processing by the authentication section 58 in a manner similar to the authentication in the loss lock request processing of FIG. 9. Then, the electronic money server 2 determines whether or not the user lock flag of the user information (FIG. 5) corresponding to the electronic money ID is ON (step 461).

If the user lock flag is ON (step 461; Y), the electronic money server 2 turns on the unlock prohibition flag of the user information corresponding to the electronic money ID (step 463). As a result, the unlock function is disabled until the restoration processing described in the first embodiment is performed. Incidentally, in the restoration processing in the second embodiment, processing by which the unlock prohibition flag is turned off is added.

Then, the electronic money server 2 turns on the loss lock flag of the user information (FIG. 5) corresponding to the electronic money ID and creates loss data for the electronic money ID in the loss database 55 (step 465).

Since loss lock is also completed because negative flag ON by user lock is completed, the electronic money server 2 does not shift to loss lock standby (therefore, does not perform loss processing in FIG. 10) and sends loss lock and unlock prohibition completion screen data to the second terminal 9 (step 467).

Incidentally, since the loss lock processing in FIG. 10 is not performed, as for the balance fixing processing (steps 409 to 411), the balance fixing processing is performed at the time of balance check (step 441) described in FIG. 15.

On the other hand, if the user lock flag is not ON (step 461; N), since the negative flag of the electronic money function section 12 is in an off state, the electronic money server 2 shifts into step 403 of FIG. 9.

That is, the electronic money server 2 turns on the loss lock flag (step 403) and sends lock standby screen data to the second terminal 9 (step 405), thereby shifting into lock standby state. The electronic money server 2 that has shifted into the lock standby state awaits for access from the portable terminal 7 having a corresponding electronic money ID and performs loss lock processing depicted in FIG. 10 in a manner similar to that in the first embodiment.

Next, the unlock processing will be described.

Figure 18:
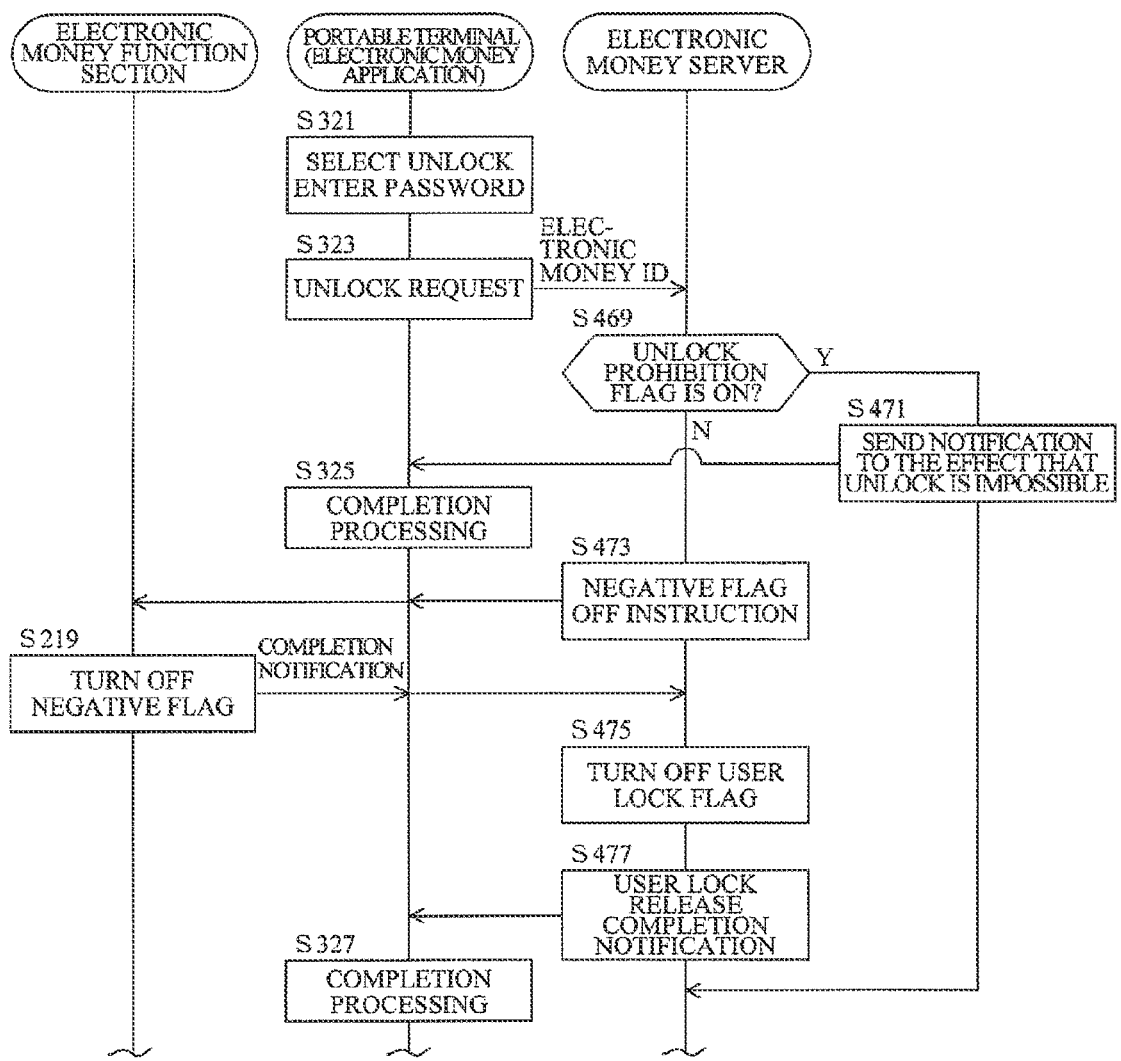
FIG. 18 is a flowchart describing unlock processing.

FIG. 18 is a flowchart describing the unlock processing.

To unlock (release) the user lock set on the electronic money function section 12, the user starts the electronic money application 7 and selects unlock. Then, the electronic money function section 12 displays a password entry screen, and the user enters a user lock password (step 321). The electronic money application 7 checks whether or not the entered user lock password matches the user lock password registered in the storing section 45 in advance. If the entered user lock password does not match the user lock password registered in the storing section 45 in advance, the electronic money application 7 performs error processing; if the entered user lock password matches the user lock password registered in the storing section 45 in advance, the electronic money application 7 accesses the electronic money server 2 and makes an unlock request by sending the electronic money ID (step 323).

When receiving the user lock request, the electronic money server 2 determines whether or not the unlock prohibition flag of the user information corresponding to the electronic money ID is ON (step 469).

If the unlock prohibition flag is ON (step 469; Y), since unlock is prohibited, the electronic money server 2 sends notification to the effect that unlock is impossible to the electronic money application 7 (step 471) and ends the processing.

The electronic money application 7 that has received the notification to the effect that unlock is impossible performs completion processing, that is, displays a message saying that unlock is prohibited on the display section 46 and ends the processing (step 325).

On the other hand, if the unlock prohibition flag is off (step 469; N), that is, if a loss lock request by the loss of the portable terminal 7 is not made, the electronic money server 2 sends a negative flag OFF instruction to the electronic money function section 12 as usual (step 473).

When receiving the negative flag OFF instruction from the electronic money server 2, after rewriting the negative flag of the negative flag area 36*d* of the storing section 36 from ON to OFF, the electronic money function section 12 provides completion notification to the electronic money server 2 (step 219).

When receiving the negative flag OFF completion notification, the electronic money server 2 turns off the user lock flag of the user information corresponding to the electronic money ID (step 475) and sends user lock release completion notification to the electronic money application 7 (step 477).

When receiving the user lock release completion notification, the electronic money application 7 performs completion processing by providing an announcement to the effect that user lock is released (step 327).

Since the negative flag of the electronic money function section 12 is turned off again by the above unlock processing, as described in FIG. 11 in the first embodiment, normal processing is performed on recharging and payment performed by the electronic money terminal 8 (FIG. 11, step 505).

As described above, according to the second embodiment, for the electronic money function section 12 of the portable terminal 7, since the electronic money function section 12 is locked in accordance with a user lock request from the portable terminal 7, settings are made to make it possible to unlock (release) the locked electronic money function section 12, and unlock is prohibited in loss lock processing, it is possible to increase security at the time of loss.

Although the embodiments of the present invention have been described, the present invention is not limited to the embodiments described above and various modifications are possible within the scope described in each claim.

For example, in the embodiments described above, prior registration to use the loss lock service is needed, and the descriptions have been given based on the assumption that, of the user information depicted in FIG. 5, a loss lock password corresponding to an electronic money ID is already set based on the access from the portable terminal 7.

On the other hand, even when there is no prior registration, registration may be performed by entering the electronic money ID and the loss lock password that are set in the electronic money function section 12 of the lost portable terminal 7 when making a loss lock request from the second terminal.

In this embodiment, by setting an unlock password in addition to a loss lock password, the level of lock is increased. Instead, by adopting a common password, the burden on the user who memorizes a password may be reduced.

The electronic money application 7 of this embodiment is configured to access the electronic money server automatically every predetermined time T, but this function may be omitted.

In this case, the restoration processing and the balance extraction processing are performed based on the access made when the electronic money application is started by the operation performed on the portable terminal 7.

Moreover, the electronic money server 2 may request access from the portable terminal 7 when receiving a loss lock request from the second terminal 9. This access request is performed by using notification by e-mail or the notification function of providing notification to the second terminal 9, transmission of e-mail, and so forth.

A case where the balance fixing processing (steps 409 to 411) is performed in the loss lock processing depicted in FIG. 10 has been described; however, the balance processing may not be performed here and the balance may be fixed at another time, for example, in the balance extraction processing (FIG. 15).

When the balance is fixed in the balance extraction processing, the balance fixing processing in steps 409 to 411 may be performed after the negative flag is turned off in steps 439 and 209.

As described above, by performing the balance fixing processing only when the fixed balance is needed, the balance fixing processing is not performed when, for example, the restoration processing is performed, which makes it possible to reduce the overall throughput.

Moreover, in the embodiments described above, the following case has been described: as a result of the electronic money server 2 issuing a negative flag ON instruction to the IC chip (the electronic money function section 12) based on the loss lock request from the second terminal 9, the negative flag of the IC chip is turned on, and the payment terminal such as the electronic money terminal 8 then checks the flag in the IC chip at the beginning of the payment processing and, if the flag is ON, suspends (disables) the electronic money function by returning an error without performing the subsequent processing.

On the other hand, in addition to that described above, the electronic money function may be suspended by the following methods. In any of these methods, as is the case with the embodiments described above, the electronic money server 2 suspends the electronic money function of the IC chip in response to a request from the second terminal via the electronic money application of the portable terminal 7.

(a) By locking the IC chip as a whole, the electronic money function is suspended. In this case, the IC chip is brought into a state in which the IC chip does not accept all accesses from the electronic money terminal 8 and so forth.

(b) By "masking" a predetermined area in the IC chip, the electronic money function is suspended. That is, the electronic money balance area is "masked", and, when receiving an access command to this area, the IC chip does not make a response (or returns a code indicating that there is no such an area). A mask flag is turned on to mask the electronic money balance area.

(c) Individual access restriction is put on a particular storage area (the electronic money balance area) in the IC chip. Also in this case, an access restriction flag is turned on.

In the embodiments described above, a case where, when a loss lock request is accepted from the second terminal 9, the electronic money ID obtained at the time of reception of the request is stored in the loss data of the loss database 55 of the electronic money server 2 and various flags, a fixed balance, a balance processing method, and so forth are saved in the loss data has been described.

On the other hand, the electronic money server 2 may make various storing units such as a loss database located outside store and save the electronic money ID obtained at the time of reception of the request, various flags, a fixed balance, a balance processing method, and so forth.

In this case, the storing unit such as the loss database may be directly connected to the electronic money server 2 via a bus line or a connection line and may be indirectly connected thereto via a network such as the Internet, radio communication, or the like.

EXPLANATIONS OF LETTERS OR NUMERALS 1 electronic money operation system
2 electronic money server
4 the Internet
5 base station
6 telephone network
7 portable terminal
8 electronic money terminal
9 second terminal

The invention claimed is:

1. An electronic money server comprising:
at least one memory operable to store program code;
and at least one processor operable to read said program code and operate as instructed by said program code to:
accept, from a second terminal which is a terminal other than a portable terminal, a lock request to lock an integrated circuit (IC) chip in the portable terminal identified by identification information included in the lock request, the portable terminal being provided with the IC chip that performs recharging and payment by addition and subtraction of a balance of an electronic money in the IC chip in accordance with addition and subtraction instructions, the second terminal not being in direct communication with the portable terminal;
store, in a lock target storage, the identification information of the IC chip identified by the identification information included in the accepted lock request;
accept access from the portable terminal;
obtain, from the portable terminal, the identification information of the chip in the portable terminal;
based on detection that the obtained identification information corresponds to the identification information stored in the lock target storage, output a first negative flag ON instruction to the IC chip of the portable terminal, and cause the IC chip of the portable terminal to enter into a locked state by turning on a negative flag of a storing section in the IC chip;
accept, from the second terminal, an extraction request to extract the balance of the electronic money of the IC chip for which the lock request has been received and the first negative flag ON instruction has been output, and store the identification information of the IC chip in an extraction target storage,
accept a second access from the portable terminal, and based on determination that the identification information of the IC chip in the portable terminal is stored in the extraction target storage, transmit a negative flag OFF instruction to the IC chip of the portable terminal to release the locked state, and output a subtraction instruction for the portable terminal that reduces the balance of the IC chip; and
output a second negative flag ON instruction to the IC chip to return to the locked state again by turning on the negative flag of the storing section in the IC chip.

2. The electronic money server according to claim 1, wherein
the IC chip of the portable terminal includes a plurality of functions, at least one of the plurality of functions is in the locked state and
the at least one processor is further configured to:
accept, from the second terminal which is the terminal other than the portable terminal, a restoration request to restore the IC chip of the portable terminal from the locked state;

store, in a restoration target storage, the identification information of the IC chip included in the accepted restoration request; and based on detection that the identification information obtained from the portable terminal corresponds to the identification information stored in the restoration target storage, output a restoration instruction for the IC chip of the portable terminal that restores the at least one of the plurality of functions from the locked state.

3. The electronic money server according to claim 1, wherein outputting the first negative flag ON instruction by the at least one processor comprise:

transmitting a balance notification request requesting notification of the balance of the electronic money in the IC chip;

storing, as a fixed balance, the balance of the electronic money received from the portable terminal based on the balance notification request; and outputting the first negative flag ON after storing the fixed balance.

4. The electronic money server according to claim 1, wherein the subtraction instruction for the portable terminal reduces the balance of the IC chip to zero.

5. The electronic money server according to claim 1, wherein the at least one processor is further configured to:

accept, from the portable terminal, the lock request to lock the IC chip by identifying the identification information of the IC chip; and output a user lock instruction for the IC chip.

6. The electronic money server according to claim 2, wherein outputting the first negative flag ON instruction by the at least one processor comprises:

transmitting a balance notification request requesting notification of the balance of the electronic money in the IC chip;

obtaining the balance of the electronic money notified by the portable terminal based on the balance notification request and storing the balance as a fixed balance; and outputting the first negative flag ON instruction after the fixed balance is stored.

7. The electronic money server according to claim 2, wherein the at least one processor is further configured to:

accept, from the portable terminal from which access has been accepted, the lock request to lock the IC chip identified by the identification information included in the lock request; and output a user lock instruction for the IC chip based on the lock request that has been accepted as a response to the portable terminal from which access has been accepted.

8. The electronic money server according to claim 3, wherein the at least one processor is further configured to:

accept, from the portable terminal from which access has been accepted, the lock request to lock the IC chip by identifying the identification information of the IC chip; and output a user lock instruction for the IC chip based on the lock request that has been accepted as a response to the portable terminal from which access has been accepted.

9. The electronic money server according to claim 4, wherein the at least one processor is further configured to:

accept, from the portable terminal from which access has been accepted, the lock request to lock the IC chip by identifying the identification information of the IC chip; and output a user lock instruction for the IC chip based on the lock request that has been accepted as a response to the portable terminal from which access has been accepted.

10. The electronic money server according to claim 6, wherein the at least one processor is further configured to:

accept, from the portable terminal from which access has been accepted, the lock request to lock the IC chip by identifying the identification information of the IC chip; and output a user lock instruction for the IC chip based on the lock request that has been accepted as a response to the portable terminal from which access has been accepted.

11. The electronic money server according to claim 1, wherein the at least one processor is further configured to:

accept, from the portable terminal from which access has been accepted, the lock request to lock the IC chip;

output a user lock instruction for the IC chip based on the lock request that has been accepted as a response to the portable terminal from which access has been accepted.

12. A non-transitory computer-readable recording medium on which an electronic money server program product is recorded, the electronic money server program product, when executed by at least one processor, causing the at least one processor to:

accept, from a second terminal which is a terminal other than a portable terminal, a lock request to lock an integrated circuit (IC) chip in the portable terminal identified by identification information included in the lock request, the portable terminal being provided with the IC, chip that performs recharging and payment by addition and subtraction of a balance of an electronic money in the IC chip in accordance with addition and subtraction instructions, the second terminal not being in direct communication with the portable terminal;

store the identification information of the IC chip whose lock has been accepted by the lock request in a lock target storage;

accept access from the portable terminal; obtain, from the portable terminal from which access has been accepted, the identification information of the IC, chip in the portable terminal;

based on detection that the obtained identification information is stored in the lock target storage, output a first negative flag ON instruction to the IC chip of the portable terminal, and cause the IC chip of the portable terminal to enter into a locked state by turning on a negative flag of a storing section in the IC chip, accept, from the second terminal an extraction request to extract the balance of the electronic money of the IC chip for which the lock request has been received and the first negative flag ON instruction has been output, and store the identification information of the IC chip in an extraction target storage;

accept a second access from the portable terminal, and based on determination that the identification information of the IC chip in the portable terminal is stored in the extraction target storage, transmit a negative flag OFF instruction to the IC chip of the portable terminal to release the locked state, and output a subtraction instruction for the portable terminal that reduces the balance of the IC chip; and output a second negative flag ON instruction to the IC chip to return to the locked state again by turning on the negative flag of the storing section in the IC chip.

13. A loss processing, method comprising:

accepting, from a second terminal which is a terminal other than a portable terminal, a lock request to lock an integrated circuit (IC) chip in the portable terminal identified by identification information included in the lock request, the portable terminal being provided with the IC chip that performs recharging and payment by addition and subtraction of a balance of an electronic money in the IC chip in accordance with addition and subtraction instructions, the second terminal not being in direct communication with the portable terminal;

storing, in a lock target storage, the identification information of the IC chip whose lock has been accepted by the lock request;

accepting an access from the portable terminal; obtaining, from the portable terminal from which access has been accepted, the identification information of the IC chip in the portable terminal;

based on detection that the obtained identification information corresponds to the identification information stored in the lock target storage, outputting a first negative flag ON instruction to the IC chip of the portable terminal, and causing the IC chip of the portable terminal to enter into a locked state by turning on a negative flag of a storing section in the IC chip;

accepting, from the second terminal, an extraction request to extract the balance of the electronic money of the IC chip for which the lock request has been received and the first negative flag ON instruction has been output, and storing the identification information of the C chip in an extraction target storage;

accepting a second access from the portable terminal, and based on determination that the identification information of the IC chip in the portable terminal is stored in the extraction target storage, transmitting a negative flag OFF instruction to the IC chip of the portable terminal to release the locked state, and outputting a subtraction instruction for the portable terminal that reduces the balance of the IC chip; and outputting a second negative flag ON instruction to the IC chip to return to the locked state again by turning on the negative flag of the storing, section in the IC chip.

14. The electronic money server according to claim 1, wherein the at least one processor is further configured to:

after storing the identification information of the IC chip in the lock target storage, enter into a standby state to await an access from the portable terminal corresponding to the identification information stored in the lock target storage; and when the access from the portable terminal is accepted in the standby state, obtain, from the portable terminal, the identification information of the IC chip in the portable terminal.

15. The electronic money server according to claim 1, wherein the at least one processor is further configured to:

based on a unlock request to release lock that is received from the portable terminal, determine whether an unlock prohibition flag corresponding to an electronic money identification (ID) attached to the IC chip is turned on, and prohibit the turning off the negative flag to unlock the IC chip based on the unlock prohibition flag being turned on.

* * * * *